US012341891B2

(12) United States Patent
Van Cleve et al.

(10) Patent No.: US 12,341,891 B2
(45) Date of Patent: Jun. 24, 2025

(54) ANONYMOUS AUTHENTICATION WITH TOKEN REDEMPTION

(71) Applicant: Google LLC, Mountain View, CA (US)

(72) Inventors: David Isaac Van Cleve, Seattle, WA (US); Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 201 days.

(21) Appl. No.: 17/924,457

(22) PCT Filed: Aug. 26, 2021

(86) PCT No.: PCT/US2021/047736
§ 371 (c)(1),
(2) Date: Nov. 10, 2022

(87) PCT Pub. No.: WO2023/027709
PCT Pub. Date: Mar. 2, 2023

(65) Prior Publication Data
US 2023/0308277 A1    Sep. 28, 2023

(51) Int. Cl.
*H04L 9/32*    (2006.01)
(52) U.S. Cl.
CPC .......... *H04L 9/3213* (2013.01); *H04L 9/3257* (2013.01)
(58) Field of Classification Search
CPC .............................. H04L 9/3213; H04L 9/3257
See application file for complete search history.

(56) References Cited

U.S. PATENT DOCUMENTS

| 10,735,205 B1 * | 8/2020 | Wentz | H04L 9/3257 |
| 11,374,910 B2 * | 6/2022 | Kravitz | H04L 63/12 |
| 11,405,365 B2 * | 8/2022 | Kravitz | G06F 21/6227 |
| 11,770,251 B2 * | 9/2023 | Nainar | H04L 9/3268 |

(Continued)

FOREIGN PATENT DOCUMENTS

| CN | 101336436 | 12/2008 |
| KR | 10-2012-0070663 | 7/2012 |

OTHER PUBLICATIONS

International Preliminary Report on Patentability in International Appln. No. PCT/US2021/047736, mailed on Mar. 7, 2024, 13 pages.

(Continued)

*Primary Examiner* — Techane Gergiso
(74) *Attorney, Agent, or Firm* — Fish & Richardson P.C.

(57) ABSTRACT

This disclosure relates to a method for anonymous attestation that includes receiving, by an application running on a client device and from a first content provider, an authentication request to authenticate a user to receive content from a second domain of a second content provider, redeeming, with an attestation token issuing system that issued an anonymous attestation token attesting to the user's authentication to the second content provider, the anonymous attestation token by transmitting the anonymous attestation token with a second request, receiving a redemption result representing whether the attestation token was successfully redeemed, signed by the attestation token issuing system using a digital signature and is operable to verify, to the second content provider, that the user is authenticated to the second content provider without identifying the user to the second content provider, and transmitting, to the first content provider, the redemption result.

20 Claims, 7 Drawing Sheets

(56) References Cited

U.S. PATENT DOCUMENTS

| | | | | |
|---|---|---|---|---|
| 12,028,455 | B2* | 7/2024 | Wagner | H04L 63/0807 |
| 2007/0244833 | A1* | 10/2007 | Camenisch | G06F 21/33 |
| | | | | 705/71 |
| 2008/0270790 | A1* | 10/2008 | Brickell | G06F 21/57 |
| | | | | 713/176 |
| 2009/0193509 | A1* | 7/2009 | Cardone | H04L 63/08 |
| | | | | 726/9 |
| 2010/0185864 | A1* | 7/2010 | Gerdes, Jr. | H04L 9/3213 |
| | | | | 713/176 |
| 2010/0325441 | A1* | 12/2010 | Laurie | H04L 9/3257 |
| | | | | 713/185 |
| 2011/0126276 | A1 | 5/2011 | Dykeman et al. | |
| 2012/0159577 | A1* | 6/2012 | Belinkiy | H04L 9/3265 |
| | | | | 726/4 |
| 2012/0167189 | A1 | 6/2012 | Aichroth et al. | |
| 2014/0282984 | A1 | 9/2014 | Schlesinger et al. | |
| 2014/0359289 | A1 | 12/2014 | Camenisch et al. | |
| 2015/0341340 | A1* | 11/2015 | Lu | H04L 9/3234 |
| | | | | 726/6 |
| 2016/0127341 | A1 | 5/2016 | Yan | |
| 2016/0241552 | A1* | 8/2016 | Lindemann | H04L 9/3231 |
| 2018/0165781 | A1* | 6/2018 | Rodriguez | G06F 21/34 |
| 2020/0014537 | A1* | 1/2020 | Ortiz | G06F 21/31 |
| 2020/0336470 | A1* | 10/2020 | Kravitz | G06F 21/6236 |
| 2021/0064780 | A1* | 3/2021 | Riedel | G06Q 20/3829 |
| 2021/0218742 | A1* | 7/2021 | Cook | G06F 21/31 |
| 2021/0312440 | A1* | 10/2021 | Badal-Badalian | |
| | | | | G06Q 20/3278 |
| 2022/0021537 | A1* | 1/2022 | Wagner | H04L 9/3218 |
| 2022/0321354 | A1* | 10/2022 | Ladd | H04L 9/3218 |
| 2022/0385642 | A1* | 12/2022 | Kravitz | H04L 63/0281 |
| 2023/0188358 | A1* | 6/2023 | Wang | H04L 9/3247 |
| | | | | 713/176 |

OTHER PUBLICATIONS

Office Action in Japanese Appln. No. 2022-570379, mailed on Mar. 25, 2024, 7 pages (with English translation).

Base91.sourceforge.net [online], "basE91 encoding" Oct. 2006, retrieved on Jan. 24, 2023, retrieved from URL <https://base91.sourceforge.net/>, 3 pages.

Developer.android.com [online], "Android Interface Definition Language (AIDL)" Jul. 2022, retrieved on Jan. 24, 2023, retrieved from URL <https://developer.android.com/guide/components/aidl?hl-en>, 19 pages.

Developer.android.com [online], "Bundle" May 2018, retrieved on Jan. 24, 2023, retrieved from URL <https://developer.android.com/reference/android/os/Bundle>, 65 pages.

Developer.android.com [online], "Protect against security threats with SafetyNet" Jul. 2017, retrieved on Jan. 24, 2023, retrieved from URL <https://developer.android.com/training/safetynet>, 3 pages.

Developer.android.com [online], "SafetyNet Attestation API" Jul. 2018, retrieved on Jan. 24, 2023, retrieved from URL <https://developer.android.com/training/safetynet/attestation#use-response-server>, 17 pages.

Developers.google.com [online], "SafetyNetClient" Jul. 2017, retrieved on Jan. 24, 2023, retrieved from URL <https://developers.google.com/android/reference/com/google/android/gms/safetynet/SafetyNetClient>, 5 pages.

Github.com [online], "Trust-Token-Api" Aug. 2019, retrieved on Jan. 24, 2023, retrieved from URL <https://github.com/WICG/trust-token-api>, 13 pages.

International Search Report and Written Opinion in International Appln. No. PCT/US2021/047736, mailed on Apr. 29, 2022, 18 pages.

Rfc-editor.org [online], "Hypertext Transfer Protocol (HTTP/1.1): Message Syntax and Routing" Jun. 2014, retrieved on Jan. 24, 2023, retrieved from URL <https://www.rfc-editor.org/info/rfc7230>, 89 pages.

Source.android.com [online], "AIDL Overview" Nov. 2022, retrieved on Jan. 24, 2023, retrieved from URL <https://source.android.com/docs/core/architecture/aidl#example>, 2 pages.

Notice of Allowance in Japanese Appln. No. 2022-570379, mailed on Sep. 2, 2024, 5 pages (with English translation).

Office Action in Korean Appln. No. 10-2022-7038973, mailed on May 8, 2025, 18 pages (with English translation).

Lee et al., "Anonymous access control framework based on group signature." 2010 2nd International Conference on Information Technology Convergence and Services. IEEE, Aug. 2010, 5 pages.

Office Action in Chinese Appln. No. 202180035302.0, mailed on Mar. 25, 2025, 18 pages (with English translation).

Ya, "Token-Based Wireless Mobile Network Privacy Preserving and Authentication Protocol" Computer Applications and Software, vol. 36. No. 5, May 2019, 81-85 (with English abstract).

* cited by examiner

ANONYMOUS AUTHENTICATION WITH TOKEN REDEMPTION

CROSS-REFERENCE TO RELATED APPLICATIONS

This application is a National Stage Application under 35 U.S.C. § 371 and claims the benefit of International Application No. PCT/US2021/047736, filed Aug. 26, 2021, the entirety of which is incorporated herein by reference.

BACKGROUND

Client devices transmit requests and other data over public networks, such as the Internet. These communications can be altered by other parties, such as parties that intercept the communications and/or intermediaries that receive the communications and forward them to other parties.

Other parties can emulate a client device to send requests that appear to originate from the client device, but actually come from a device of the other parties.

Various authentication techniques can be used to verify the identity of client devices attempting to perform transactions over public networks. At the same time, these authentication techniques can implicate privacy concerns. For example, users of client devices may not wish to share information (such as stable device identifiers) that could be used to track client devices or the users of these client devices, and data providers may operate under privacy protection standards that prevent them from receiving or handling such information.

SUMMARY

This specification describes authentication techniques for verifying the integrity/authenticity of client devices, while at the same time avoiding the use of stable device identifiers that could be used to track client devices or their users.

In general, a first innovative aspect of the subject matter described in this specification can be embodied in a method for anonymous attestation, including receiving, by an application running on a client device and from a first server hosted on a first domain of a first content provider, an authentication request to authenticate a user to receive content from a second domain of a second content provider different from the first content provider, in response to receiving the authentication request, redeeming, by the application and with an attestation token issuing system that issued an anonymous attestation token attesting to the user's authentication to the second content provider, the anonymous attestation token by transmitting the anonymous attestation token with a second request, receiving, by the application and from the attestation token issuing system in response to the second request, a redemption result representing whether the attestation token was successfully redeemed and is signed by the attestation token issuing system using a digital signature, wherein the redemption result is operable to verify, to the second content provider, that the user is authenticated to the second content provider without identifying the user to the second content provider, transmitting, by the application and to the first content provider, the redemption result signed by the attestation token issuing system.

In some implementations, the redemption result is operable to verify to the recipient that the user is authenticated to the second content provider while allowing the user to remain anonymous without providing the first content provider with the set of credentials for the user.

In some implementations, the second content provider is a news provider, the first content provider is a news aggregator domain, and transmitting, by the application and to the first content provider, the redemption result signed by the attestation token issuing system is performed in response to a user action requesting access to a resource hosted by the news provider.

In some implementations, the second content provider is a media hosting platform, the first content provider is a social media platform, and transmitting, by the application and to the first content provider, the redemption result signed by the attestation token issuing system is performed in response to a user action requesting access to a resource hosted by the media hosting platform.

In some implementations, the method includes transmitting, by the application on a client device and to a trusted program having access to credentials of a user of the client device that authenticate the user to an entity, a first request for an anonymous attestation token attesting to the user's authentication to the second content provider, transmitting, by the trusted program and to the attestation token issuing system, a third request for an anonymous attestation token, the third request including a set of credentials for the user of the client device, and receiving, by the application and from the attestation token issuing system, an anonymous attestation token comprising (i) an attestation token creation timestamp indicating a time of creation of the anonymous attestation token, and (ii) a second digital signature of the attestation token issuing system.

In some implementations, the method includes requesting, by the application and from the second content provider through an electronic resource of the first content provider, the content from the second content provider.

In some implementations, the method includes receiving, by the application, the content from the second content provider.

In some implementations, the digital signature of the attestation token issuing system is created according to a blind signature scheme.

In some implementations, the digital signature of the attestation token issuing system is created using a group signature scheme and an anonymous certificate issued to the client device, and the method includes storing the anonymous certificate in a secure private keystore on the client device.

In some implementations, transmitting the redemption result signed by the attestation token issuing system further comprises providing additional data that (i) is signed by the application, and (ii) does not correlate the user with the set of credentials.

In some implementations, the request indicates a number of attestation tokens to be issued.

In some implementations, the request is signed with a third digital signature using a private key maintained by the application, and the third digital signature can be verified using a public key (i) corresponding to the private key and (ii) published by the application.

In some implementations, the second digital signature is created using a private key maintained by the attestation token issuing system, and the third digital signature can be verified using a public key (i) corresponding to the private key and (ii) published by the attestation token issuing system.

In some implementations, the redemption result comprises a single bit representing whether an attestation token was successfully redeemed.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

Using attestation tokens to authenticate client devices or users of provides a secure communication channel between the client device and the computers or other devices of other entities. Including, with the attestation token, a digital signature of the data included in the attestation token enables the entities to verify that the data in the attestation token was not changed after the attestation token was created. In addition, the inclusion of a token creation time in the attestation token enables recipients to determine whether requests are new or potentially part of a scheme by a third party to fraudulently use the identity of an authorized device to perform an operation.

For example, the attestation token can be used to identify that a client device is authorized to access a particular resource without identifying the client device to the resource, allowing the party keeping the resource to be assured that the client device is a legitimate authorized user and allowing the client device to maintain its anonymity with respect to the resource.

The attestation token system provides the ability to authenticate devices and/or users across different websites within the same platform and across different platforms without sharing personally identifiable information (PII) with websites or platforms. For example, the attestation token system allows users to access resources and content from platforms or providers that require authentication through third party content aggregating platforms and websites without providing PII to either the third party content aggregating platforms and websites or the providers. The attestation token system is privacy-preserving, enforcing boundaries between different websites and platforms, and provides access to resources and content in a convenient, seamless way. Rather than providing, to the third party content aggregating platform, PII such as user names and passwords to access a resource using such PII, the client device can provide a redemption result that authenticates to the third party content aggregating platform that the user of the client device has access to the resource. Therefore, the third party content aggregating platform does not receive the PII of the user that is normally used to access the resource (e.g., the user name and password of the user that would be used to access the resource directly) and the publisher of the resource is not able to determine that the user is accessing the resource through the third party content aggregating platform. This preserves the user's privacy with respect to the user's PII for the resource and preserves the user's privacy of using the third party content aggregating platform.

The attestation token system improves the user experience by removing sources of user friction. For example, the attestation tokens can be used to allow user access to restricted resources without requiring the user to provide additional authentication information.

The attestation token can also include a device integrity verdict that indicates the integrity of the client device that transmitted the attestation token, which enables the recipient(s) of the attestation token to verify that the data came from a trusted client device, e.g., rather than from an emulator or a compromised device. The device integrity verdict can be generated and digitally signed by a trusted device analyzer (e.g., a third-party device analyzer) so that recipients of the attestation token can verify that the client device was evaluated by a trusted device analyzer and that the data in the device integrity verdict was not modified after creation by the trusted device analyzer.

While attestation tokens protect the integrity of communications transmitted from client devices, there are potential privacy issues associated with the use of attestation tokens. A first privacy issue with is that reuse of the same attestation token within multiple interactions with a content publisher or platform can potentially enable an attestation token recipient to correlate multiple requests transmitted by the same client device and aggregate user data based on the correlation. The techniques described in this document can enhance privacy against such correlation by using multiple attestation tokens, each including a unique public key of the client device. For example, the client device can generate a batch of N public/private key pairs, and then send the N public keys to the third-party device analyzer to receive a batch of N corresponding attestation tokens. Then the client device can, for example, use a new attestation token for each request; or the client device can use the same attestation token for all requests within a certain interval of time; or the client device can use the same attestation token for all requests originated from the same application on the client device; or some combination thereof. Limiting the use of each public key limits the amount of requests that a recipient can correlate based on the public key, and can increase the amount of assurance the application server has at the time it consumes the redemption record. For example, the application server can determine that the older the token, the greater the possibility that the client has inadvertently exposed the token to malware. Using this batch approach also reduces the burden on the device analyzer by having fewer requests to process, reduces the consumption of network bandwidth, and reduces latency at the client device when transmitting a request that will include an attestation token that would otherwise be introduced if the client device sent a request for an attestation token each time an attestation token was needed.

A second privacy issue is that sharing stable public keys of the client device with the device analyzer can potentially enable the device analyzer to track the client device. For example, if the recipient of multiple distinct attestation tokens can learn that the device analyzer received those attestation tokens in the same batch request from the same device, and therefore the recipient of the tokens can correlate multiple requests transmitted by the same client device and aggregate user data based on the correlation. The recipient would need to collude with or breach the device analyzer data store in order to obtain such data. The techniques described in this document can enhance privacy against such tracking by sending blinded versions of the public keys to the device analyzer rather than the raw values of the public keys. For example, the client device can generate a batch of N public-private key pairs, blind the N public keys (or a cryptographic hash of public keys), and then send the N blinded keys to the device analyzer; the third-party device analyzer returns a batch of N corresponding blind signatures without ever receiving the raw values of the client device public keys.

The attestation tokens described may encode only a limited amount of information due to the described blinding scheme, in order to increase the difficulty of encoding an expiry time within the tokens and increase security of the tokens. For example, one method of limiting a tokens' lifetime in the presence of the limited amount of information is to define each token to be valid only during the lifetime of the issuance key used to generate the token.

The token generation and redemption process, which prevents PII from being shared with either the party requesting the attestation token that provides restricted content and/or resources or the party through which a user is accessing the restricted content and/or resources, can be integrated with existing systems as part of the resource and/or content accessing dataflow. This process improves user privacy, experience, and access to resources and/or content while expanding the functionality of intermediary platforms and websites and increasing the reach of the parties requesting the attestation tokens without requiring additional effort on the part of the user. Furthermore, this process does not require that the party requesting the token receive any information regarding who the user being authenticated is, or how the tokens are being created. The receiving party simply receives an attestation token that indicates that the user or device attempting to access a particular resource and/or content has been authenticated, their identity was verified as an authorized party, or that they are otherwise trustworthy to a particular level. The receiving party is also assured of the identity of the requesting client device/user to ensure that they are the correct user/an authenticated user.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1A:
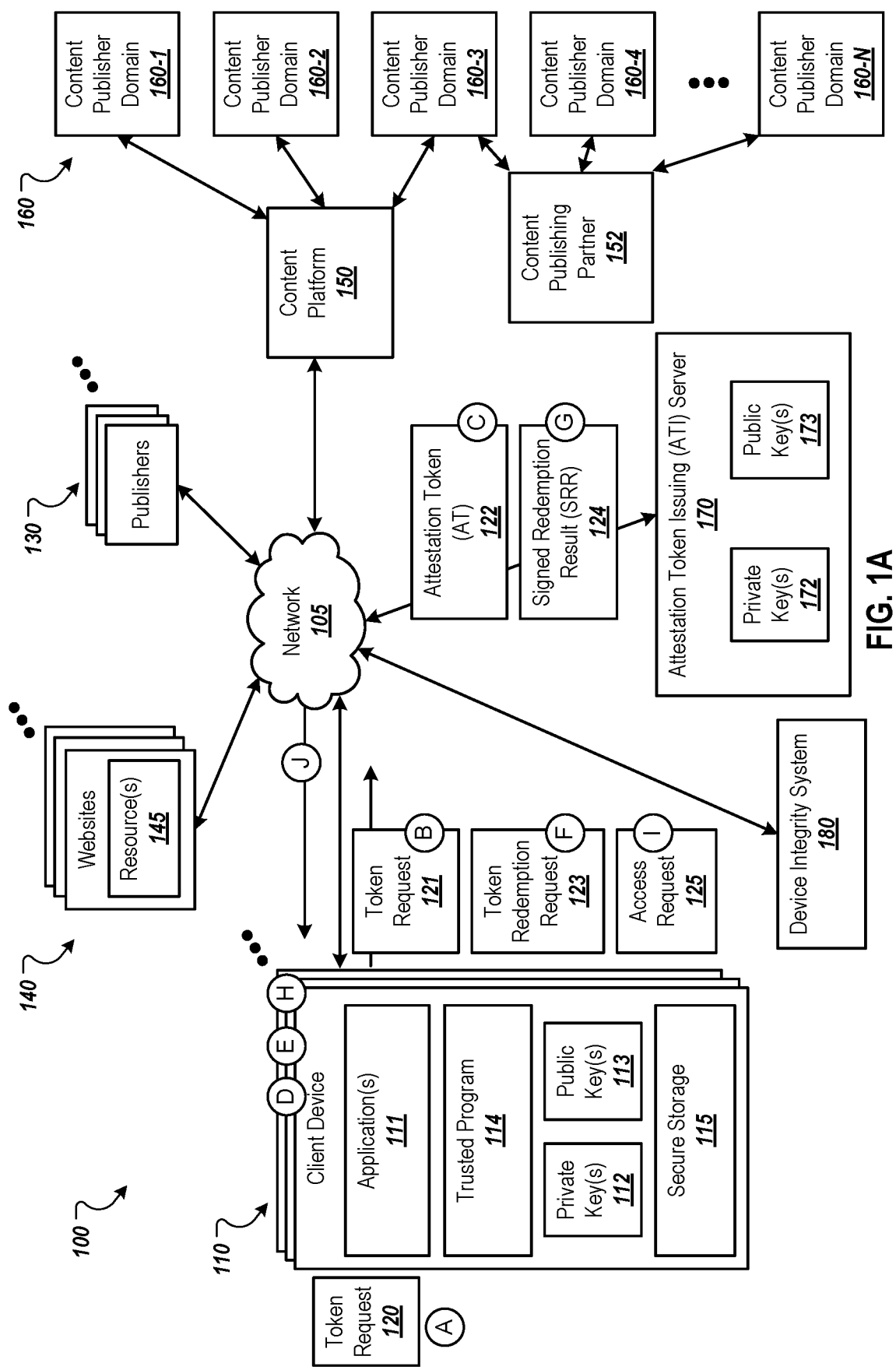
FIG. 1A is a block diagram of an environment in which digital content is distributed.

In general, systems and techniques described in this document can provide a secure communication channel between an isolated environment, such as a website accessed within a browser's sandbox environment, and client devices and other entities outside of the isolated environment, such as content publishers. Within the secure sandbox environment, code can be safely executed within an isolated environment. However, in order to preserve the security of the environment, code running inside of the environment may not have access to information outside of the environment.

For example, a web browser may not have access to device level information such as the authenticity of the device and/or request being made. In some implementations, although a web browser may be able to access the same raw input information that a separate on-device "device integrity verification" subsystem can access, the actual process of transforming that information into a device integrity verdict can be technically impractical or duplicative to replicate within the browser itself. The systems and techniques described as follows provides a pipeline from outside of the sandbox environment to inside of the sandbox environment. The process guarantees security because the data cannot be falsified, and privacy because the data cannot be used to track user activity.

Outside entities such as client devices and/or other content publishers or providers can provide, with requests and other data transmissions over a network, an attestation token (or a redemption record for a redeemed token) to validate the integrity of the requests and the integrity of the client device. The requests can include, for example, requests to manage data of the users (e.g., to delete user-related data), and/or requests for content and/or access to resources. Securing the communication channel using the attestation token ensures user privacy and data security by preventing any data leakage to either the isolated environment or a requesting party to whom the attestation token is provided. The attestation token includes several layers of verification that ensure that the authentication of the client device cannot be falsified and that user privacy is preserved such that no PII is transmitted. The redemption process and the use of the signed redemption result as a security signal provided to the website to which access is requested or location from which a resource is being requested, instead of the token itself, ensures that the tokens cannot be used to track client device/user activity or determine a user's identity.

In some approaches, the attestation token can be digitally signed using a private key of a trusted program. The trusted program can confidentially maintain the private key. The attestation token can include, among other things, a public key that corresponds to the private key, a payload, and an attestation token. The attestation token can include a verdict that indicates a level of integrity of the client device, as determined by a trusted device integrity system, e.g., a third-party device integrity system maintained by an entity that is different from a user of the client device and the recipient of the attestation token. The attestation token can also include the public key (or cryptographic hash of the public key) of the client device to bind the attestation token to the client device.

The attestation token can be digitally signed by the attestation token issuing server using a private key that the attestation token issuing server keeps confidential. A public key that corresponds to this private key can be provided to the recipient system so that they can trust that the client device was evaluated by the attestation token issuing system, e.g., by verifying the digital signature of the attestation token using the public key. This combination of using two pairs of keys provides a secure communication channel that enables recipients to validate the integrity of client devices and the integrity of communications received from the client devices and binds the attestation token to the client device so that other devices cannot use the attestation token to falsify their integrity.

In some approaches, the attestation token issuing system does not receive the raw data of the public keys for inclusion in the attestation token. Instead, the trusted application can send a blinded public key or a blinded derivative of the public key (e.g., a blinded truncated cryptographic hash of the public key) by blinding the public key or its derivative using a blind signature scheme. With a blind signature scheme, the attestation token issuing system can certify the integrity of the client device without receiving raw values of public keys of the client device, enhancing the privacy of the client device or user by reducing the risk of potential tracking via public key. The attestation token issuing system can publish blind signature verification keys that recipients can use to verify the blind signatures.

In other approaches, a group signature scheme can be used, with the attestation token issuing server as a group manager. For example, the attestation token issuing server can publish M group verification keys for M trustworthiness groups, assign the client device to one of the M trustworthiness groups, and deliver an anonymous certificate to the client device. The client device can anonymously sign attestation tokens using the anonymous certificate and these anonymous signatures can be verified by recipients using the published group verification keys. With a group signature scheme, neither the attestation token issuing server nor the recipient of the attestation token needs to receive raw values of public keys of the client device, further enhancing the privacy of the client device or user by reducing the risk of potential tracking via public key.

Figure 1B:
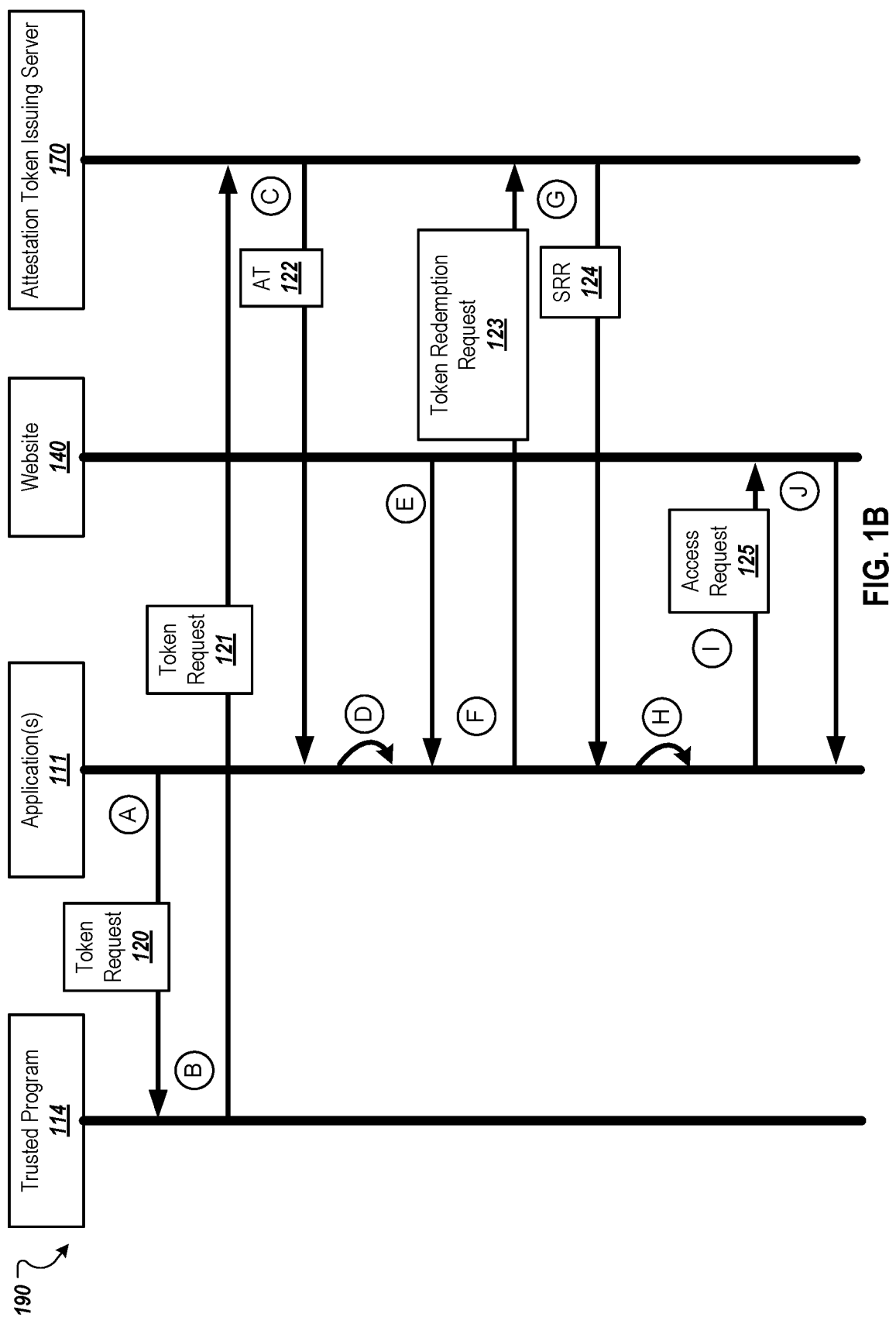
FIG. 1B is a data flow diagram of an example process for requesting, issuing, and redeeming attestation tokens.

FIGS. 1A and 1B show an example of a system 100 and process 190 for requesting, issuing, and redeeming attestation tokens. FIG. 1A is a block diagram of an environment 100 in which digital content is distributed. FIG. 1B is a data flow diagram of an example process 190 for requesting, issuing, and redeeming attestation tokens in, for example, the environment 100 as shown in FIG. 1A. The example environment 100 includes a data communication network 105, such as a local area network (LAN), a wide area network (WAN), the Internet, a mobile network, or a combination thereof. The network 105 connects client devices 110, publishers 130, websites 140, a content platform 150, an attestation token issuing (ATI) server 170 (which can also be referred to as a token issuing system) and a device integrity system 180 (which can also be referred to as a device integrity computing system). The example environment 100 may include many different client devices 110, publishers 130, websites 140, content platforms 150, and attestation token issuing servers 170.

In one particular example, a user of a client device can attempt to access or request a resource and/or content from a website that requests authentication of the user and/or client device 110. The system as shown in FIG. 1A and the process as shown in FIG. 1B provide a seamless way for users to access or request resources and/or content while providing the entity providing the resources and/or content with verification that the user and/or client device is a legitimate user who is authorized to access or request the resources.

A website 140 is, or can include, one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

Content platform 150 is a platform that provides access to various different, unaffiliated resources and/or domains. Content platform 150 can provide access to resources that are not associated with each other or with content platform 150. For example, content platform 150 can be a social media platform that provides access to content from various other websites, such as video hosting platforms, image hosting platforms, blogs, etc. Content platform 150 can communicate with and/or be integrated with various content publisher domains. For example, content publisher domains 160 can be different websites that include resources to which content platform 150 provides access. In some implementations, the content publisher domains 160 can be different websites, similar to websites 140, and provide access to resources similar to resources 145. For example, content publisher domain 160-3 can be an image hosting website that provides access to images uploaded by its users. In some implementations, content platform 150 can request and provide access to resources through an entity, content publishing partner 152, that selects digital components on behalf of digital component providers 160 in response to digital component requests.

A client device 110 is an electronic device that is capable of communicating over the network 105. Example client devices 110 include personal computers, mobile communication devices, e.g., smart phones, digital media players, smart speakers, wearable devices (e.g. smart watches), and other devices that can send and receive data over the network 105. A client device 110 can also be a gaming device or streaming device. A client device 110 typically includes applications 111, such as a web browser and/or native applications to facilitate the sending and receiving of data over the network 105. A native application is an application developed for a particular platform or a particular device. Publishers 130 can develop and provide the native applications to the client devices 110.

Client device 110 can include one or more private key(s) 112 and one or more corresponding public key(s) 113. The private key(s) 112 and public key(s) 113 can be maintained by application 111, trusted program 114, and/or other programs on client device 110. Client device 110 can store one or more different sets of private/public key pairs. In some implementations, private key(s) 112 and public key(s) 113 are stored in secure storage 115.

The client device 110 can also include a trusted program 114 to which a user or the client device 110 has been authenticated. In some implementations, the trusted program 114 can be a native application of the client device 110. For example, the trusted program 114 can be the operating system of the device, or an application for execution on client device 110 that is associated with a particular entity to which client device 110 is authenticated.

For example, trusted program 114 can issue attestation tokens to other applications for use in securing communications from the client device 110. In some implementations, the trusted program 114 is trusted by an entity from which client device 110 requests resources and/or content and that requires authentication. For example, trusted program 114 can be a program that is trusted by an entity that requests an attestation token. In one example, the trusted program 114 can be a web-based interface for an entity that is accessible through the application 111. In some implementations, the trusted program 114 is associated with the entity requesting an attestation token. For example, the trusted program 114 can be a mobile application maintained by Example News Organization. Example News Organization can create and maintain news content that is accessible by paid subscribers and news content that is accessible to all visitors.

The attestation token issuing (ATI) server 170 generates the attestation tokens requested by trusted program 114. The trusted program 114 can include trusted code from a reliable source that is difficult to falsify. In one example, the trusted program 114 can be an operating system, a portion of an operating system, a web browser, etc. Generally, the trusted program 114 is difficult to infiltrate, and the amount of time and effort that a perpetrator would need to expend to tamper with the trusted program 114 is prohibitively high. Additionally, because the trusted program 114 is provided and maintained by a reliable source, any vulnerabilities that arise can be addressed by the source. Using such a trusted program in this way provides a technical advantage of increased security at the client device, since the trusted program is difficult to infiltrate. Additionally, the trusted program provides the advantage of mitigating vulnerabilities in the trusted program because the program is maintained by a reliable source.

The trusted program 114 can be local to client device 110. For example, the trusted program 114 can be a device driver of the operating system of client device 110. In some implementations, the trusted program 114 operates entirely locally to client device 110, reducing the need to transmit user information. In some implementations, the trusted program 114 can operate locally to client device 110 and over a network, such as the network 105. For example, the trusted program 114 can be a mobile application installed on user device 110 that transmits and receives information over the network 105.

The trusted program 114 can generate encryption keys (e.g., public/private key pairs), store encryption keys in secure storage 115 (e.g., a secure cache), store attestation tokens in secure storage 115, generate attestation tokens, generate blind signatures of encryptions keys or derivatives thereof, and/or fetch and store certificates, as described in more detail below. In some implementations, the trusted program 114 interacts with a device integrity client to send to and receive data from the device integrity system. In some implementations, the trusted program 114 is configured to generate a request for an attestation token 122 for each of a set of specified types of requests, e.g., requests to change user privacy settings.

The attestation token can be used by entities to validate the integrity of the request and the integrity of the client device 110. For example, some entities may attempt to falsify the parameters of resource or content requests, e.g., to specify different resources with which the content will be provided and/or to specify a different user to which the content will be presented in order to gain access to data to which those entities may not normally have access. In addition, some malicious parties may attempt to emulate others' client devices for nefarious purposes.

In the process performed by system 100, the attestation token is redeemed with the ATI server 170 to generate a signed redemption result (SRR). The signed redemption result indicates whether an attestation token was successfully redeemed, but does not include information such as a user identifier, the time at which the token was generated, the time at which the token was redeemed, validation information provided by the trusted program 114, or other PII of the user. The signed redemption result can also be used by entities to validate the integrity of the request and the integrity of the client device 110, and can be used instead of the attestation token. By accepting a signed redemption request as validation instead of performing the token redemption and validation process, the process performed by system 100 preserves the privacy of users while ensuring that requests and users have been authenticated. In some implementations, the signed redemption result can be used in addition to the attestation token to validate the integrity of the request.

In the context of this system, both of the attestation token and the signed redemption result is used by the entity to verify that the user is authenticated to receive other data, such as requested content or information. The signed redemption result is signed by the ATI server, and attests that the user is authenticated to receive the particular data being requested without providing data identifying the requesting user or other information, such as the extent to which the user is authenticated or the level of the user's authentication. In one example, the entity can provide the attestation token to the resource provider for redemption, the resource provider redeems the attestation token, signs the result of the redemption, and the signature on the result can be used to inform the entity that an attestation token was previously successfully redeemed, and thus the user requesting a resource is authenticated to receive the requested resource.

The attestation token and signed redemption result process provides a secure communication channel between the client device 110 and the computers or other devices of other entities through intermediaries that prevents others from altering the requests and ensures that the request came from a validated client device 110, and by proxy, an authorized user.

The signed redemption result, which can be a very small amount of data (e.g., 2 bits) provides a secure communication channel between a sandbox environment, such as a web browser, and an application running outside of the sandbox environment. In addition to reducing the amount of data being transmitted between, for example, a website and an application running outside of the sandbox environment. In some implementations, the signed redemption result can be more than 2 bits. For example, the signature can contain more than 2 bits. In some implementations, the number of bits in common between the redemption result and the data of the client device to which the attestation token issuing service has access (i.e., "joinable bits") is limited in order to reduce the ability for observers to link the interactions of the same user or device with the attestation token issuing service and the recipients of the SRR.

For example, if an attestation token includes only 2 bits joinable with the attestation service, this limited amount of information guarantees that any information derived from the attestation token, such as the redemption result, will have, at most, 2 bits joinable with the attestation service. The attestation data is not directly transmitted between the web browser and the application running outside of the web browser because the attestation data is both validated and redeemed with the ATI server. Because of this process, the data that is transmitted between the application running outside of the web browser and the secure environment of the web browser communicates the same information (i.e., that a particular entity and/or request has been authenticated and the entity's identity has successfully been attested to) as an attestation token provides, but without the risk of exposure or interception, the process preserves the privacy of the user.

The ATI server 170 can generate different types of attestation tokens 122 that have different forms or that contain different content. In some implementations, the attestation token 122 includes a set of data that includes a public key 173 of the ATI server 170, a token creation time that indicates a time at which the attestation token 122 is created, payload data, and verdict of integrity that is generated by the device integrity system or by the trusted program 114 using data received from the client device 110. The attestation token 122 can also include a digital signature generated by the ATI server 170 using a private key 172 that corresponds to the public key 173 included in the attestation token 122 and the set of data. That is, the ATI server 170 can digitally sign the set of data using the private key 172 and include the resulting digital signature in the attestation token 122 with the set of data. In some implementations, the attestation token includes the user's credentials within the payload.

In the process as described with respect to FIGS. 1A and 1B, the ATI server 170 generates and redeems the attestation tokens, providing the security benefits of attestation tokens without requiring each entity to create and maintain an attestation token system, and providing additional privacy benefits to users. The process by which the attestation tokens are generated are described below with respect to FIGS. 2-7. Additionally, because the request process includes a token redemption process such that only the attestation token system requires verification data that preserves the privacy of users and provides the benefits of an attestation token while limiting the transfer of and access to PII of users.

In some implementations, attestation tokens can be set to expire within a predetermined period of time as a security measure. By requiring attestation tokens when attestation tokens expire, the ATI server 170 can ensure that tokens must be requested on a regular basis, and therefore that the entity whose identity is being attested is authenticated on a regular basis.

When attestation tokens expire, the corresponding data at the ATI server 170 can be updated to ensure that the attestation tokens cannot be later redeemed. In some implementations, the ATI server 170 assesses data, such as the age of the attestation token, prior to determining whether to redeem the token and generate a signed redemption result.

In some implementations, the attestation token 122 includes a set of data that includes payload data, an attestation token creation time that indicates the time at which the attestation token 122 is created, and a digital signature of the set of data. In this example, the ATI server 170 can generate the digital signature using a group signature scheme and a certificate issued to the client device 110 by the device integrity system or the ATI server 170.

Generally, recipients of an attestation token then validate the attestation token and/or an integrity verdict included in the attestation token (if appropriate). If the attestation token is successfully validated, the recipient can determine whether the client device 110 is a trusted device and process the request accordingly. If the attestation token is not successfully validated, the recipient can ignore or delete the request, e.g., without responding to or changing data in response to the request.

The attestation token creation time indicates a time at which the attestation token 122 was created. The trusted program 114 can record the creation time when the trusted program 114 creates the attestation token. This attestation token creation time can be a high resolution timestamp (e.g., accurate to the second, to the millisecond, or to the microsecond). The attestation token creation time can be used to determine whether a request 120 that includes the attestation token 122 is a new or recent request. For example, the entity that receives the attestation token 122 can compare the token creation time to a current time or a time at which the attestation token 122 was received. If the difference between the two times exceeds a threshold, the entity can determine that the request is not new, or invalid, as described in more detail below.

The attestation token creation time can also be used to detect replay attacks. For example, if multiple requests having the same set of data, including the same attestation token creation time, are received, the entity that receives the requests can determine that the requests are duplicates and/or that the requests are part of a replay attack.

The attestation token creation time, in combination with other data, can also serve as a transaction identifier for a request. For example, the transaction identifier can be a combination of two or more of the attestation token creation time of the attestation token 122 and a public key 113 of the attestation token 122 in implementations in which the attestation token 122 includes a public key 113. The transaction identifier can be used to deduplicate multiple versions of the same request 120 received from multiple channels. For example, ATI server 170 can receive the same request from both trusted program 114 and associated website 140. In another example, ATI server 170 can receive the same request from both the content platform 150 and the content publishing partner 152. In this example, the transaction identifier can be based on the token creation time of the attestation token 122 and the public key 113 of the attestation token 122. The ATI server 170 can compare the two pieces of data in two or more requests to determine whether the requests are duplicates.

The payload can include data for the individual request 120. For example, can include information about the requested resource (e.g., topic of the resource), information about the context of the resource (e.g., the number of slots, the type of slots, the size of the slots, etc.), information about the client device 110 (e.g., type of device, IP address of the device, geographic location of the client device 110) if the user has enabled this feature, and/or other appropriate information.

In either example, the attestation token can be redeemed, and a redemption result can be included in a request for content that the application 111 provides to the website 140 so that the website can guarantee that the request is valid and/or from an authorized user, but cannot access PII of the user. The application 111 can include an SRR in requests sent to the content platform 150 or other recipients, such as websites 140 for access to resources 145.

If the request 120 is to manage the user's data at a publisher 130, the content platform 150, the content publishing partner 152, a content publisher domain 160, or another entity, the request 120 can include data specifying the requested change. For example, if the user selected to remove all of the user's data from a content publisher domain 160-2, the payload would include data specifying this removal of data and the content publisher domain 160-2 (e.g., an identifier or network address for the content publisher domain 160-2).

A device integrity system 180 can additionally evaluate device-level fraud detection signals received from the client device 110, e.g., from the trusted program 114, and determines a level of trustworthiness (or integrity) of the client device 110 based on the device-level fraud detection signals. The device-level fraud detection signals can include data representing operating characteristics or metrics of the client device that can be used to determine whether a client device is compromised or whether the client device is operating as a normal client device or an emulated client device. Certain operating characteristics and metrics are often different for genuine client devices relative to emulators. In some implementations, the device-level fraud detection signals include application-level fraud detection signals that include operating characteristics and metrics of the application 111 requesting attestation tokens. The trusted program 114 can collect these device-level fraud detection signals and include the signals in the request for attestation tokens.

The device integrity system 180 can issue a verdict that indicates the level of trustworthiness (or integrity) of the client device 110. The recipients use the verdict to determine whether to trust a request 120 that includes the verdict. For example, if the verdict indicates that the client device 110 is not trustworthy, the recipient can ignore the request, e.g., not respond to the request.

In some implementations, the processes as described with respect to FIGS. 1-7 can be performed such that the trusted program 114 is a website to which a user has been authenticated, and the website 140 is a program or application to which a user is requesting access or from which the user is requesting resources.

When the application 111 sends a request over the network 105 for access to a particular resource 145 or other content, the application 111 can use a privacy-preserving technique to attest to the identity, authenticity, and/or authorization status of the user. This privacy-preserving technique allows an attestation token to be generated and redeemed without providing either of the application 111 or the website 140 from which resources or other content is requested with information that could be used to identify or otherwise track the user. An example 190 process for performing the privacy-preserving technique is shown in FIG. 1B.

In step A, the application 111 can generate a request 120 for one or more attestation tokens and provide the token request 120 to a trusted program 114. For example, the application 111 can be a web browser through which a user of client device 110 is accessing various websites, such as website 140, and/or requesting access to or content from various resources such as resource 145, publishers 130, and content platform 150, among other entities. In this example, the trusted program 114 can be an application on the client device 110 that is trusted by the entity from which the application 111 is requesting resources or to which the application 111 is requesting access. In one example, trusted program 114 can be an application created and hosted by Example News Organization for the smartphone, and the user may be requesting access through a news aggregator on web browser 111 to a news article on website 140 hosted by Example News Organization.

The user of client device 110 can provide log-in credentials to the trusted program 114 such that the user is authenticated to the trusted program. For example, the user can sign in to Example News Organization using the username and password for their account with Example News Organization. The account can be a free account or a paid subscription account, and the user may be granted additional authorization to particular content and/or resources that users who do not have log-in credentials do not have authorization to view, access, and/or receive. For example, the Example News Organization may provide access to a certain subset of its articles to users without any log-in credentials, a larger subset of its articles to users with log-in credentials for an account without a paid subscription, and its full archive of articles and content to users with log-in credentials for an account with a paid subscription.

Application 111 can perform step A without receiving a request for attestation or integrity information from a website 140, the content platform 150, and/or other entities. For example, application 111 can transmit an attestation token request 120 to trusted program 114 at a regular interval to refresh the attestation tokens. In some implementations, the attestation tokens can expire after a predetermined period of time to ensure that attestation data remains accurate and to reduce the possibility of a third party or a bad actor accessing the attestation data without authorization and using the attestation data. When the attestation tokens expire, application 111 can delete the expired attestation tokens, automatically generate a request 120 for attestation tokens, and provide the request to trusted program 114.

In step B, the trusted program 114 can generate a signed request for an attestation token, allowing a token issuing server, such as attestation token issuing (ATI) server 170, to generate an attestation token that attests to the identity of the user based on the information provided by trusted program 114.

For example, the smartphone application 114 created and hosted by Example News Organization can create a request 121 for an attestation token and provide the request to the ATI server 170. This request can be signed by the Example News Organization application 114 to indicate integrity information regarding the request. For example, the request can be signed by the Example News Organization smartphone application 114 to indicate whether the request is being made on behalf of a user having log-in credentials, and/or the type of log-in credentials (i.e., a free account, a first-tier paid subscription account, an account on a shared family plan, etc.). In some implementations, the signature on the request can provide a verdict of whether the request and/or entity is authenticated. For example, the Example News Organization application can determine that the request is legitimate and/or the user has been authenticated with the Example News Organization through the application using valid credentials. The Example News Organization application 114 can then include a verdict of authentication with request 121.

In some implementations, request 121 is a new request generated by trusted application 114 using the request 120 from the application 111 to create a request 121. In some implementations, request 120 is signed by trusted application 114 to indicate the validity of the request and/or user, and the signed request 120 is transmitted as request 121. In some implementations, request 120 and validity information provided by trusted application 114 is transmitted together as request 121.

Because the application 111 is not directly requesting the attestation token, the application 111 does not require access to the information included in the request for the attestation token, and therefore can facilitate access to a particular resource and/or delivery of content without having access to PII of the user. This allows the attestation process to be performed in a seamless way that preserves the privacy of the user. Although the application 111 is able to receive, store, and redeem attestation tokens, as described below with respect to steps C-I of FIGS. 1A and 1B, application 111 does not directly receive or have access to the PII that the user provides to trusted program 114 other than PII that the user has given permission to application 111 to access. Thus, in addition to preserving the privacy of users, the attestation token generation and redemption process as described additionally allow the application 111 to provide functionality, such as content aggregation, without requiring PII information from users. This process improves the functioning of the system, creating a more secure flow of information and reducing the amount of input required from a user.

The process as described with respect to FIGS. 1A and 1B includes two different sets of signatures, providing two steps in the chain of trust. The attestation token issuer signs the attestation token and/or the signed redemption result, and the web browser includes a signature on the request to access a portion of the website and/or resources.

Figure 2:
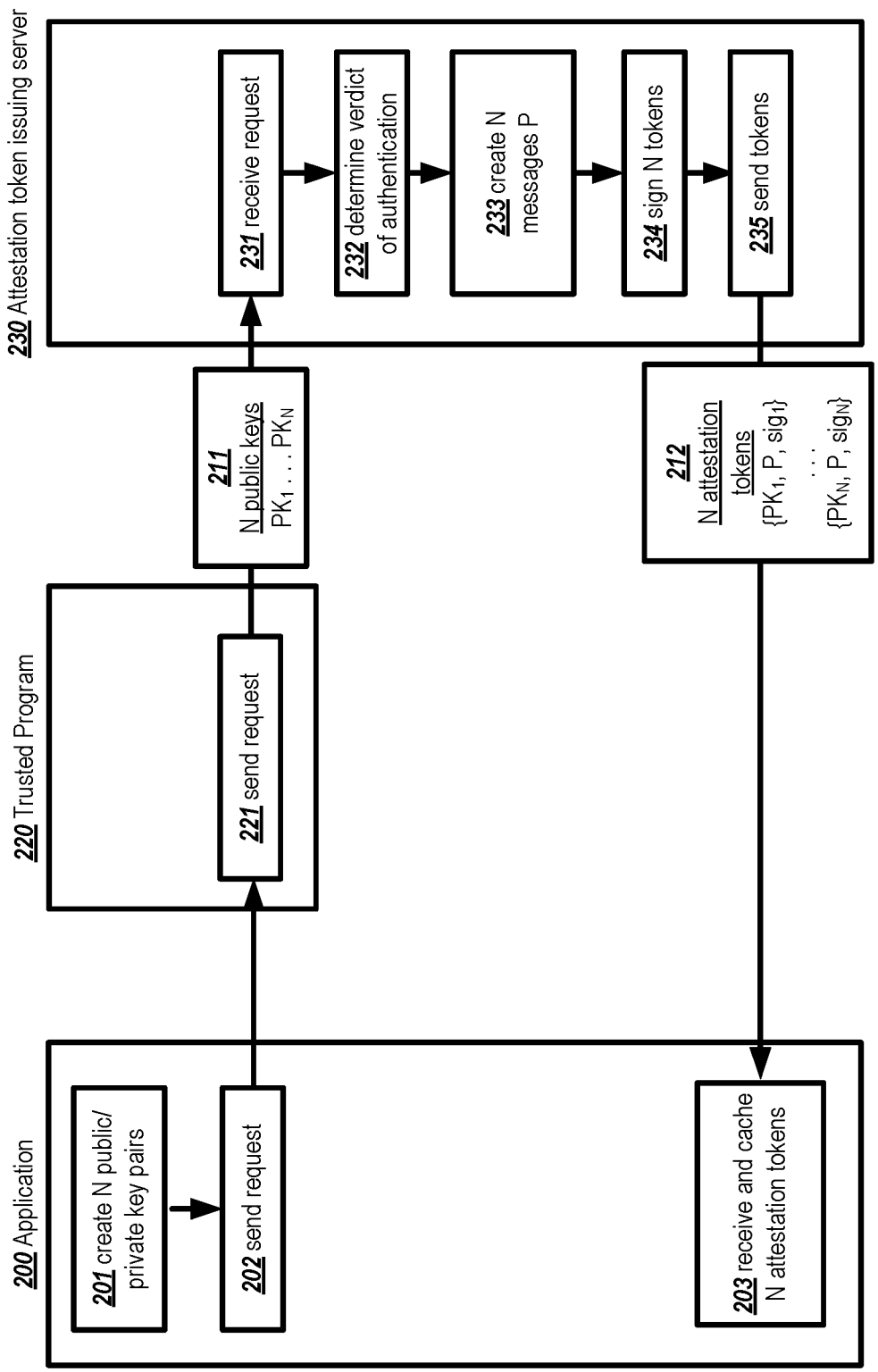
FIG. 2 is a flow diagram that illustrates an example process for requesting and receiving a batch of N attestation tokens.
Figure 3:
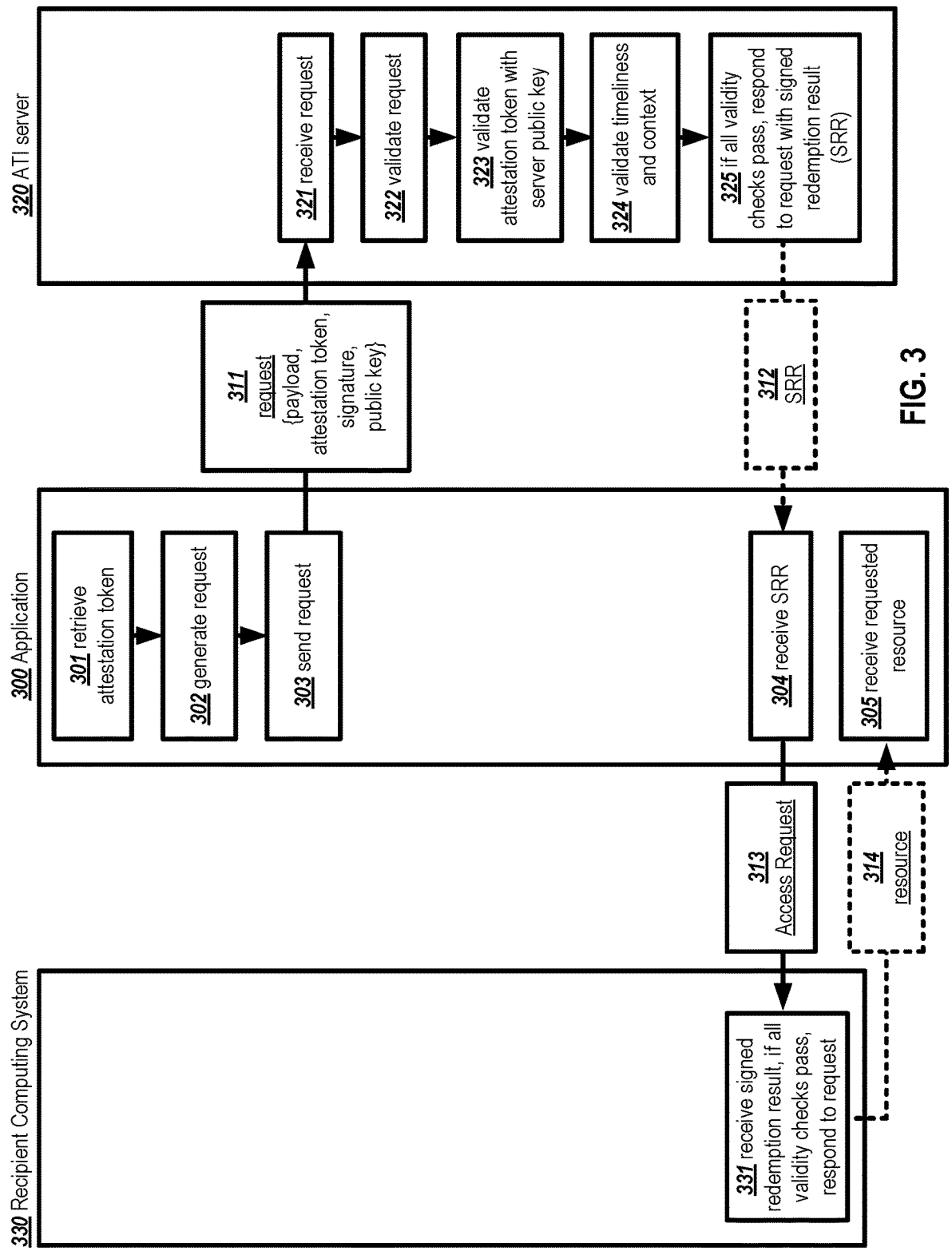
FIG. 3 is a flow diagram that illustrates an example process for sending, receiving, and validating an attestation token.

As discussed above, in some approaches, the trusted program 114, application 111, or client device 110 can include one or more private/public key pairs with the attestation token request (and the device integrity verdict associated with the device public key). In some implementations, the private/public key pairs can be varied across multiple attestation tokens, to enhance privacy of the client device or user against tracking by attestation token recipients. For example, the client device can generate batches of private/public key pairs and retrieve corresponding batches of attestation tokens from an attestation token issuing server, so that the reuse of attestation tokens is reduced or eliminated. An illustrative example of this batch process is depicted in FIG. 2.

In step C, ATI server 170 issues an attestation token. This token issuance step can include many different parts. Generally, ATI server 170 issues an attestation token that carries a very small number of bits attesting to the identity of the requesting client device and/or user. Prior to issuing the attestation token, ATI server 170 can verify that the request is valid, providing an additional layer of security for the website 140, resource 145, content publisher domain 160, and/or any other entities to which the SRR is provided.

For example, ATI server 170 can verify the signature on the request 121. In some implementations, as described above, trusted program 114 can provide a blind signature on the request 121. In some implementations, the attestation token issuing server does not receive the raw data of the public keys for inclusion in the attestation token. Instead, the client device can send a blinded public key or a blinded derivative of the public key (e.g., a blinded truncated cryptographic hash of the public key) by blinding the public key or its derivative using a blind signature scheme. With a blind signature scheme, the attestation token issuing server can certify the integrity of the client device without receiving raw values of public keys of the client device, enhancing the privacy of the client device or user by reducing the risk of potential tracking via public key. The attestation token issuing server can publish blind signature verification keys that recipients can use to verify the blind signatures.

Once ATI server 170 has verified the validity of the request, ATI server 170 can issue an attestation token 122 that attests to the identity of the client device 110 and/or the user with respect to trusted program 114 and/or an entity associated with trusted program 114.

The number of attestation token(s) issued in step C can correspond directly to the number of attestation tokens requested in step A and/or step B. For example, application 111 can request 5 attestation tokens in step A, and trusted program 114 can provide the request for 5 attestation tokens to the ATI server 170. The number of attestation tokens to be requested and/or issued can be determined by application 111, trusted program 114, client device 110, and/or ATI server 170.

In some implementations, ATI server 170 can vary the number of attestation tokens issued from the number of attestation tokens requested. For example, ATI server 170 can automatically determine, based on an average number of attestation tokens requested from various sources, a number of attestation tokens to issue in response to a request. ATI server 170 can determine a number of attestation tokens to issue in response to the request by balancing security with a reduction in traffic: Issuing more tokens reduces the number of times that tokens must be requested and then issued, but also reduces the frequency with which the validity of a request and the identity of a user of application 111 is verified.

In some implementations, the number of attestation tokens issued in step C depends on a maximum number of attestation tokens that can be issued. For example, an attestation token recipient can publish (1) a limit on the number of tokens that can be sent from each individual client device or application to a selected destination domain of the recipient within a selected time frame (e.g. no more than X requests within Y seconds, minutes, or hours); (2) a limit on the number of tokens that can be sent from one or more selected applications on an individual client device to a selected destination domain of the recipient within a selected time frame (e.g. no more than X requests from application A—or from any application other than application A—within Y seconds, minutes, or hours); (3) a limit on the number tokens that can be sent from an individual client device to a selected endpoint within a selected destination domain of the recipient within a selected time frame; (4) a limit on the number of tokens that can be sent from one or more selected applications on a client device to a selected endpoint within a selected destination domain within a selected time frame; or (5) any combination of two or more of such limits.

The attestation token 122 itself can be a single bit of information that indicates whether the bearer is authenticated. For example, a value of 0 can indicate that the bearer is not authenticated, and a value of 1 can indicate that the bearer is authenticated.

The response that ATI server 170 issues to application 111 can include the attestation token 122 itself and can additionally include 1 or more encrypted bits of information. In some implementations, the additional bit(s) of information can be included in the attestation token 122, such that the attestation token 122 includes 1 bit indicating whether the bearer is authenticated and 1 or more bits of additional information. For example, at the time of issuance, ATI server 170 can include 1 bit of private metadata to be passed from outside of the secure sandbox environment of the application 111, such as verified user credentials or other data, to inside of the secure sandbox environment of the application 111.

Figure 4:
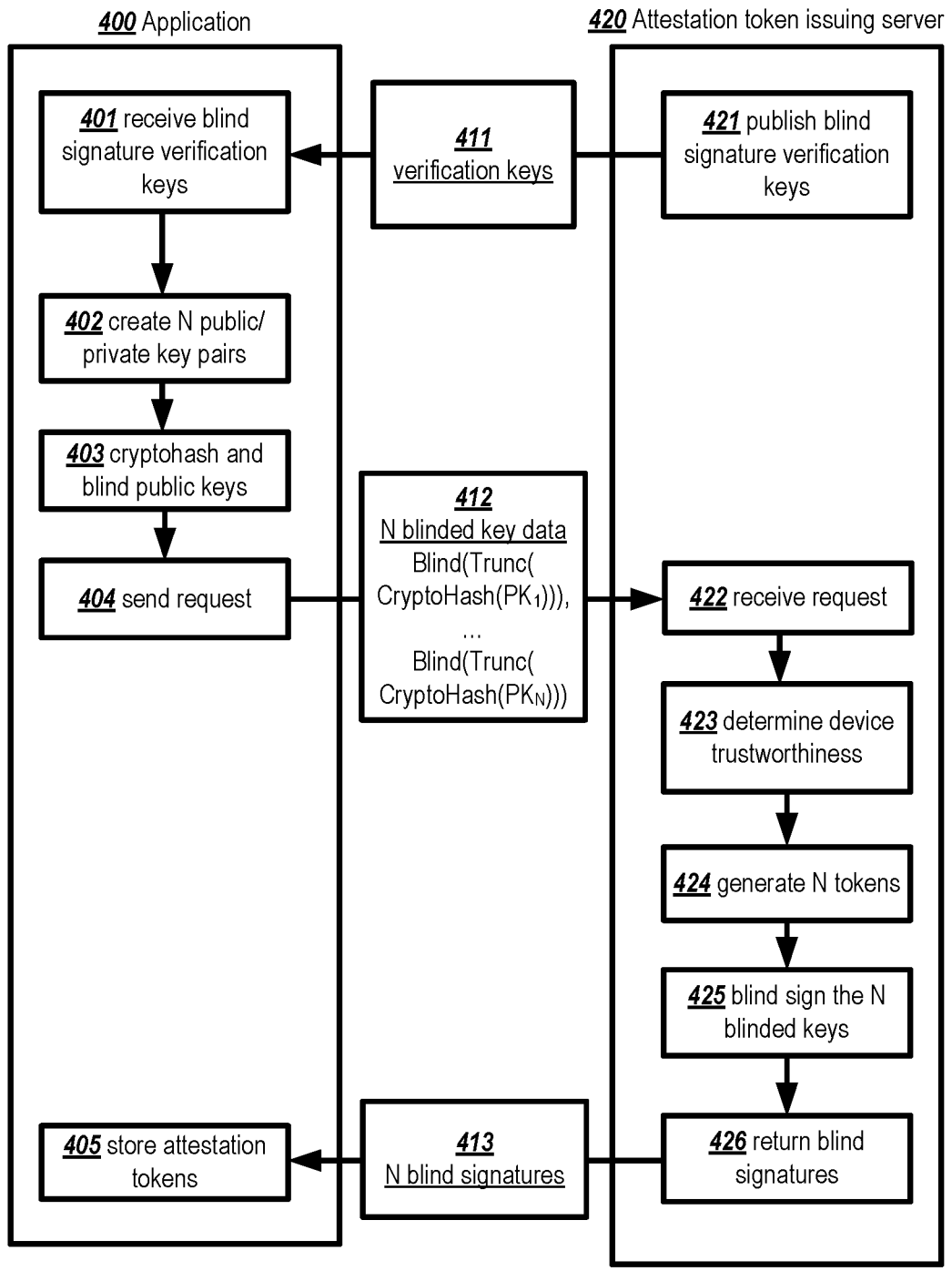
FIG. 4 is a flow diagram that illustrates an example process for requesting and receiving a batch of N blind-signed attestation tokens.
Figure 5:
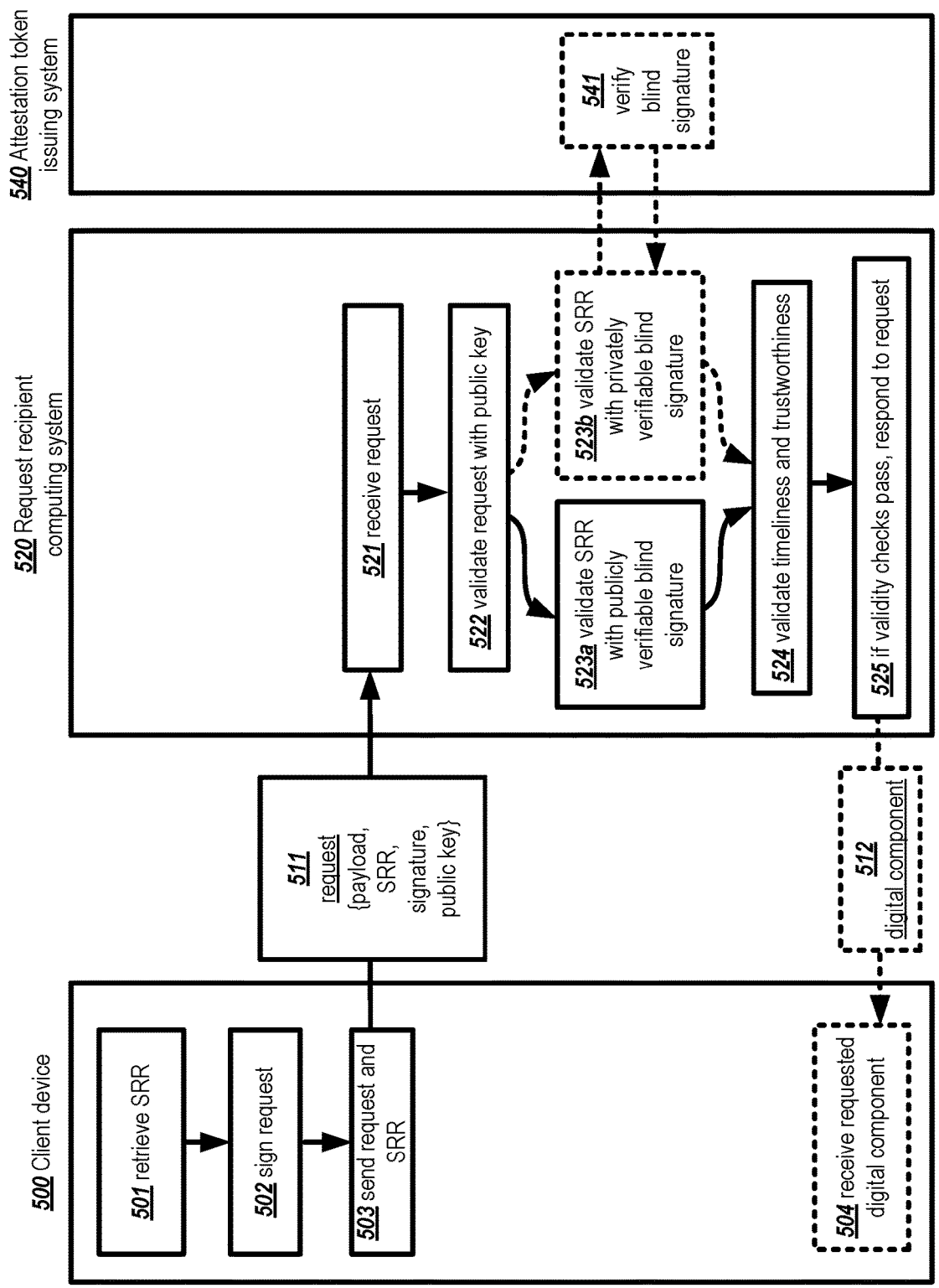
FIG. 5 is a flow diagram that illustrates an example process for sending, receiving, and validating a blind-signed attestation token.

ATI server 170 can additionally use multiple private signing keys to sign the attestation token. These private signing keys, which can be verified using corresponding verification keys that are made available by ATI server 170, serve as a signature that is part of the chain of trust. When a recipient of the attestation token is able to verify the signing keys using the corresponding verification keys made available by ATI server 170, the recipient can trust that the ATI server 170 issued the attestation token. This process of signing the attestation token can be performed using, for example, a blind signature scheme, so that the attestation token issuing server does not see the raw data of the public keys of the client device. For example, the client device can generate batches of private/public key pairs, and then blind the public keys (or suitable derivatives of these public keys that can be used as values for the commit phase of the blind signature scheme, such as cryptographic hashes of the public keys, or cryptographic hashes of the public keys concatenated with a device model number) using a blind signature scheme before sending the public keys to an attestation token issuing server to retrieve corresponding batches of attestation tokens. In this example, the attestation tokens are blindly signed using public keys. An illustrative example of this batch process is depicted in FIG. 4.

Additionally, ATI server 170 can use multiple private signing keys with corresponding verification keys that are made available by ATI server 170 to sign the SRR in a process similar to the process described above with respect to signing the attestation token in step C.

The combination of n verification keys and a single bit of information provides n*2 different combinations, and these combinations additionally encrypt a small amount of information into the token, which is verifiable by the application 111. The encrypted amount of information is verifiable by application 111, such as a web browser, to ensure that additional information was not encrypted into the token, because the result of the encryption will reveal the number of bits that are encrypted. If application 111 determines that additional data has been encrypted into the attestation token, application 111 does not need to store the token or redeem it. For example, if application 111 verifies the attestation token prior to storing the token, then application 111 can simply discard the token. If, for example, application 111 verifies the attestation token prior to redemption, then application 111 can discard the token and refrain from attempting to redeem the token.

For example, if ATI server 170 attempts to encrypt more than the expected number of bits into the attestation token, the attestation token will fail a check performed by the application 111. Application 111 can, for example, periodically check for public keys and/or verification keys provided by ATI server 170. Application 111 can then use the public keys to verify the ATI server 170's digital signature. If, however, none of the verification keys verifies the attestation token, then the application 111 will not attempt to redeem the token and may discard the attestation token.

In step D, the application 111 stores the attestation token(s) received from the ATI server 170. For example, application 111 receives attestation token 122 from ATI server 170 and then stores the token in secure storage. For example, application 111 can store attestation token 122 in a secure cache that is maintained by application 111 or client device 110.

In step E, a trigger event for attestation token redemption occurs. In some implementations, website 140 can request validation from application 111 prior to providing access or transmitting a resource. For example, if a user of client device 110 attempts to access a feature to add a custom background to their profile on Example Social Media Website 140, Example Social Media Website 140 may request validation from application 111 prior to granting access to the feature. In some implementations, application 111 can automatically redeem attestation tokens to create a store of SRRs to be used. For example, a user of application 111 may have a pattern of accessing Example News Aggregation Website 140 every day before work at 7 a.m., and application 111 can automatically redeem attestation tokens for various Example News Websites 140a, 140b, and 140c from which articles are shown on Example News Aggregation Website 140.

In order to preserve the privacy of the user, the system 100 implements a token redemption process that allows the attestation token to be redeemed, attesting to the identity of the user while keeping the details of the token private to the ATI server 170 itself. The token redemption process includes generating, by the application 111, a request to redeem an attestation token. The token redemption request and the attestation token is provided to the ATI server 170, which generates a signed redemption result (SRR). This signed redemption result, which indicates that the attestation token was successfully (or unsuccessfully) redeemed and does not provide PII of the user or information that can be used to track a pattern of redemption or usage, is provided to the application 111 in response to the token redemption request. The application 111 can then include the SRR in the request to access resources or other content from the website 140 to attest to the identity of the user and/or authenticity of the request. Because the SRR is provided to the website 140 and not the attestation token, the website 140 can have confidence that the user has authorization to access the resource and/or receive the content without having access to PII of the user.

In some implementations, the ATI server 170 determines whether there are whether there are any valid attestation tokens for a particular issuer. If there are no tokens available for the given issuer, the ATI server 170 rejects the request with an error. If there are tokens available for the given issuer, the ATI server issues an attestation token to the requesting entity. The issuer can either consume the token and act based on the result, including an SRR response header to allow a redemption attestation to be forwarded to other parties without exposing the credentials or user information of the entity whose identity is being attested. Additionally, the issuer may include the information within the attestation token and/or the SRR to indicate how long (e.g., in seconds) the redemption record should be cached for. In some implementations, if the information is not included, the lifetime of the SRR will be tied to the lifetime of the attestation token information that confirmed the redeemed token's issuance. In some implementations, the SRR is treated as an arbitrary blob of bytes from the issuer.

The token redemption process and the process of using the SRR to authenticate a request and/or user also provides a secure mechanism for transmitting information from outside of the sandbox environment of an application 111 into the sandbox environment. Traditionally, for applications 111 such as web browsers, the application is running inside of a sandbox environment and is isolated from other entities and information in order to provide a secure environment. The system and process as described with respect to FIGS. 1-8 maintains the security of a sandbox Additionally, because the recipient of the SRR is not performing the verification and redemption of the token, the recipient of the SRR does not need to request or process information such as attestation token information. This allows the process to preserve the privacy of users and improve the security of data that is transmitted, because the attestation tokens can be issued to users of application 111 without requesting additional information when the users have provided their credentials to trusted program 114.

In some implementations, ATI server 170 is associated with trusted program 114, website 140, content platform 150, and/or one or more content publisher domains 160. For example, ATI server 170 can be maintained by the entity Example News Organization that operations the Example News Organization mobile application 114 and the Example News Organization website. In some implementations, ATI server 170 is a separate entity from trusted program 114, website 140, content platform 150, and/or one or more content publisher domains 160, and does not require developing infrastructure for processing the attestation token. For example, ATI server 170 can be a server designated by the website 140 to which a user is attempting to gain access as a trusted attestation token issuing system. Website 140 would not need to develop or maintain infrastructure for processing the attestation token, and instead accepts signed redemption results from ATI server 170. The system and process as described with respect to FIGS. 1A and 1B allow websites, content publishers, and other content providers and resources to verify that requests are authentic and/or that users are authorized to access/receive content without needing to know how the tokens are requested, generated, and/or redeemed.

For example, if the application 111 sends a request to another entity (e.g., to a publisher 130, the content platform 150, the content publishing partner 152, or a content publisher domain 160) to manage, e.g., delete, the data stored by that entity, this request can include an SRR.

In some implementations, the application 111 is configured to automatically send SRRs with specified types of requests. For example, each application 111 that requests attestation tokens and sends SRRs can include a software development kit (SDK) or application programming interface (API) that causes the application 111 to access and/or redeem the attestation tokens and access and/or send the SRRs. The API can specify a set of requests, e.g., requests for managing user data, requesting access to resources and/or content for which a user needs authorization, etc., for which SRRs are to be included. For example, certain types of requests for content or for access to particular resources such as requesting a news web page for paid subscribers, may require an SRR.

In step F, application 111 sends a token redemption request 123 to ATI server 170. This step of redeeming the token with the ATI server 170, which issued the token, allows an SRR to be provided instead of an attestation token. Data associated with the issuance and redemption of an attestation token may be used as a trackable signal to track user activity, whereas the signed redemption result provides only information that the bearer of the SRR has successfully redeemed an attestation token, and does not provide potentially sensitive, identifiable, or trackable information, such as the context in which the token was redeemed, the time at which the token was redeemed, and/or the authentication information provided prior to the token being issued, among other information.

Application 111 transmits data indicating an attestation token for redemption along with the token redemption request 123. In some implementations, the token redemption request 123 includes the attestation token for redemption. In some implementations, application 111 transmits the attestation token along with the token redemption request 123. In some implementations, application 111 transmits data indicating the successful issuance of an attestation token to the user of client device 110.

At redemption time, when the ATI server 170 receives the token redemption request 123, ATI server 170 also receives an attestation token. If the attestation token is legitimate and verifiable, the attestation token is a token that ATI server 170 previously issued and was stored by the application 111. The ATI server 170 receives an attestation token with the token redemption request 123 and extracts one of the possible combinations of the bit of information and the encryption keys. The bit, described above, indicates whether the bearer of the attestation token was verified. In some implementations, the multiple different encryption keys available can provide additional information regarding the attestation token and the level of authentication. For example, the different public keys can indicate different levels of authorization or different levels of authentication. In some implementations, the token information is verified by the application 111 prior to storage, and can also be verified by the ATI server 170 prior to redemption to verify that the token was issued by the ATI server 170 itself and to ensure that the application 111 has not modified the token.

In step G, ATI server 170 generates and transmits the signed redemption result 124 to application 111. Once ATI server 170 has verified that the attestation token indicated in the token redemption request 123 is valid and/or was issued by ATI server 170 itself, ATI server 170 can generate and then sign a redemption result. The signature from ATI server 170 adds an additional link in the chain of trust, and allows the recipient of the signed redemption result to trust that the attestation token was redeemed with the ATI server 170 without providing additional information to the recipient that can be used to track the user's activity or identity.

ATI server 170 verifies that the attestation token indicated in the token redemption request 123 by verifying, for example, that one or more digital signatures associated with the attestation token have not been falsified. For example, ATI server 170 can verify that one or more digital signatures with which the ATI server 170 itself signed the attestation token as described in step C have not been falsified. ATI server 170 can perform this check by using its private key to decrypt the attestation token.

In some implementations, ATI server 170 can verify one or more digital signatures from, for example, application 111 have not been falsified to ensure that the token redemption request 123 is legitimate. For example, ATI server 170 can compare the signature data with one or more public keys published by the application 111. In some implementations, the digital signature can simply be metadata provided with the token redemption request 123 that indicates that the request was generated by application 111.

In some implementations, the ATI server 170 can verify additional token data, such as the redemption time, the context for the redemption, and/or the time at which the attestation token was issued, among other metrics and characteristics. In some implementations, the ATI server 170 may identify particular contexts under which a particular type of attestation token can be redeemed, and can verify whether the current context is a valid context in which the attestation token can be redeemed. For example, the ATI server 170 may receive information from a particular website 140 that attestation tokens for accessing subscriber-only crossword games may only be redeemed when attempting to access a crossword game. However, the token redemption request 123 may indicate that an attestation token for accessing subscriber-only crossword games is being redeemed without data indicating that an attempt was made to access a subscriber-only crossword game. ATI server 170 may then determine that the context for the redemption is not satisfied, and may either deny the token redemption request by transmitting an indication of denial or unsuccessful redemption, invalidating the attestation token, and/or simply not responding to the token redemption request, among other actions.

In some implementations, the ATI server 170 may determine whether the attestation token has expired at the time that the token redemption request 123 is received. For example, the ATI server 170 can determine, based on a creation time associated with the attestation token, how long the attestation token has been outstanding, and whether the attestation token has expired. In one example, the ATI server 170 can determine that an attestation token for access to perform searches on a research database must be less than 25 minutes old in order to be redeemed. Later, if the ATI server 170 receives a token redemption request 123 indicating an attestation token for access to perform searches on the research database that is one week old, the ATI server 170 may determine that the attestation token has expired, and may either deny the token redemption request by transmitting an indication of denial or unsuccessful redemption, invalidating the attestation token, and/or simply not responding to the token redemption request, among other actions. The expiration period for an attestation token can be any amount of time, such as 10 seconds, 15 minutes, 3 hours, 6 days, two weeks, etc.

Once the ATI server 170 has completed its verification of the attestation token and/or the token redemption request, the ATI server 170 generates a signed redemption result. The SRR 124 includes data indicating whether the attestation token was successfully redeemed, and does not include additional data that can be used to track user activity or to identify the user associated with the credentials used to generate the attestation token that was redeemed.

The process of generating a signed redemption result that provides only an indication of whether an attestation token was successfully redeemed ensures security for the recipient of the signed redemption result and privacy for the user for whom the signed redemption result was generated.

For example, by generating a signed redemption result and providing the signed redemption result to the website 140 instead of providing an attestation token, the website 140 cannot track the original request for the attestation token and correlate the attestation token with a particular user. As described below with respect to FIG. 4, because the attestation token was signed using a blind signature scheme, the ATI server 170 which issued the token can only verify that the ATI server 170 itself signed the token and that the token has not been modified and or previously redeemed. The ATI server 170 is unable to see when the attestation token was signed or any additional parameters were associated with the initial request for an attestation token, preserving the privacy of users requesting the attestation token.

In step H, application 111 stores the SRR in secure storage. For example, application 111 can store the SRR 125 in a secure cache location, similar to the storage in which the attestation token 122 was stored.

In step I, application 111 generates and transmits an access request 125 to the website 140. The access request 125 can additionally include parameters such as which includes the SRR and other parameters. Application 111 can sign the access request 125 with a digital signature as an additional link in the chain of trust. For example, application 111 can sign key parameters in the access request 125. In some implementations, if all parameters are sensitive or important, all parameters can be signed in the access request 125.

In some implementations, step I is triggered by website 140. For example, application 111 may attempt to access a resource 145 or a particular section of website 140 and website 140 may request authentication from application 111.

In some implementations, step I is automatically performed by application 111 based on information application 111 detects from website 140. For example, application 111 can detect from data associated with website 140 that authentication may be required. The data can be stored by application 111 or provided by website 140, or otherwise accessible to application 111. For example, the data can be stored at a central, shared location that multiple different applications 111, installed on multiple different devices can access, such as a central database. In some implementations, application 111 can determine, based on stored data, that website 140 requires authentication. For example, the first time that application 111 attempts to access website 140, application 111 can receive data indicating a request for authentication. On subsequent attempts to access website 140, application 111 can automatically determine that authentication will be requested in order to access website 140, and provide a SRR when attempting to access website 140 and/or a resource 145.

In step J, website 140 attempts to verify the SRR provided in the access request. If website 140 can verify the SRR, website 140 can provide access to the portion of the website 140 indicated in the access request 125 or provide access to the resource 145 requested.

The process as described above with respect to FIGS. 1A and 1B is secure and private. In some implementations, when the blinding scheme or group signature scheme as described above is implemented to issue attestation tokens, the process allows different platforms, content providers, and publishers to verify that users are authorized to access particular content while preserving user privacy such that no one party in the process is able to track user activity or link the activity to a particular user or the user's information.

In some implementations, if the attestation tokens are issued without blinding or group signatures, the tokens may contain high-resolution timestamps, or detailed application information, among other potentially sensitive information or information that can be used to link subsequent web activity to the particular device if there is collusion between the attestation token issuance server and content publisher.

In one particular example, the trusted program 114 is a mobile application installed on client device 110, a user's smartphone, and is Example News Organization's official trusted application. The application 111 is a web browser installed on client device 110, and website 140 is Example News Organization's official website. A user who is a subscriber of Example News Organization and is signed on to Example News Organization's application 114 and wishes to access content on Example News Organization's official website 140 on client device 110 can have a seamless browsing experience. For example, web browser 111 can generate a token request and provide the request to Example News Organization application 114. Example News Organization application 114, to which the user has already provided their login credentials and is authenticated, can generate a signed token request 121 to ATI server 170. In this particular example, ATI server 170 can be an attestation token issuing server maintained by Example News Organization. In some implementations, ATI server 170 can be a trusted server to which Example News Organization entrusts the token issuing task. The signed token request 121 can include the user's credentials for verification by ATI server 170. Upon receiving and verifying user's credentials and/or the request 121, ATI server 170 can issue attestation token 122 to the web browser 111. The attestation token 122 can include at least one bit indicating whether the user's credentials and/or request 121 were authenticated. The attestation token 122 can be stored in a secure cache of web browser 111. Application 111 can then generate and transmit a token redemption request 123 that indicates the stored attestation token 122 to ATI server 170. If ATI server 170 is able to verify the attestation token indicated in the token redemption request 123, ATI server 170 generates a signed redemption result 124 and transmits the SRR 124 to web browser 111. Each of the previous steps can be performed prior to a user requesting access to a particular resource 145 or portion of website 140. When the user of client device 110 requests access to a new crossword puzzle on Example News Organization's website 140, web browser 111 can generate and transmit access request 125 to Example News Organization's website 140. The access request 125 includes the SRR 124 and other key parameters, such as required metadata or other information requested by website 140. In this particular example, Example News Organization website 140 is able to determine that the user has a subscription, but does not have access to the user's identity and cannot track the user's activity because the blinding, or other privacy-preserving technique, used to generate the attestation token itself produces the token in a privacy-preserving manner. When a privacy-preserving technique is used to generate the attestation token, the attestation token would allow a content publisher to determine that a user is authenticated, but does not have access to the user's identity and cannot track the user's activity, even if the issuer were not transforming the token into a signed redemption result.

In another example, if the website 140 is instead a mobile application or web interface for Example News Aggregation Platform, where Example News Aggregation Platform is separate and different from Example News Organization, the use of a token redemption process and the SRR instead of the token itself allows Example News Aggregation Platform to provide access to information maintained by Example News Organization by learning only that the user requesting access is an authenticated user with Example News Organization, without the ability for either of Example News Aggregation Platform or Example News Organization to connect or extrapolate user information or activity between the parties. In this way, Example News Aggregation Platform is aware of the user's activity within Example News Aggregation Platform's domain, and Example News Organization is aware of the user's activity within Example News Organization's domain, but Example News Aggregation Platform is not aware of the user's activity within Example News Organization's domain or vice versa. Neither platform is able to determine this user activity or data through the process as described above with respect to FIGS. 1A and 1B.

Commonly used methods of authentication across platforms involve asking a user to provide their credentials for one domain or entity through a different domain or entity, giving permission to the different domain or entity to access the user's information. The process as described with respect to FIGS. 1A and 1B removes the ability of one entity to request access to a user's data for another entity by removing the sign-in process from the process of accessing a particular website or resource. By using a token issuance and redemption process, the process allows a user to convey an authentication without providing the data in a raw, intelligible form to the any one of the parties except for the trusted program to which the information was already provided and the attestation token issuing server, which must attest to the user's authentication.

The process as described with respect to FIGS. 1A and 1B provide the ability to transfer authentication across different websites 140 and different platforms, reducing user friction and providing a better user experience.

In another example, a user who has a valid subscription to Example Video Streaming Service can be issued an attestation token, which can be redeemed for an SRR. The SRR can be used to access and/or view videos made available to users with subscriptions to Example Video Streaming Service that are embedded in a social media post without requiring the user to sign in each time. In particular, the process described can allow the user to access content without requiring the user to sign in at all within the application hosting the social media post, as long as the user has signed in in the video streaming service's application.

Although some methods allow a user to sign in once within a hosting application and allow the authentication to persist for the lifetime of the application, privacy-motivated functional changes can render such approaches, which rely on data such as "third-party cookies," unusable in the future.

The described attestation token-based authentication process provides better privacy characteristics, reduces the number of sign-ins required with third parties, and can continue to work in future scenarios where other approaches do not.

In another example, a user who has a valid subscription to Example Music Hosting Platform can have the Example Music Hosting Platform application installed on their device. The user can authenticate themselves to the Example Music Hosting Platform application and access music made available to users with subscriptions to Example Music Hosting Platform on various websites without adding their activity to their history.

In yet another example, a user who has a valid subscription to Example Video Streaming Service can access a video made available to users with subscriptions to Example Video Streaming Service that was sent to them in a chat message from a friend on a social media platform. The user can access the video, assuring the Example Video Streaming Service that they are an authenticated user without providing their account information.

As discussed above, in some approaches, the private/public key pair (and the verdict associated with the public key) can be varied across multiple attestation tokens, to enhance privacy of the client device or user against tracking. For example, the client device can generate batches of private/public key pairs and retrieve corresponding batches of attestation tokens from an attestation token issuing server, so that the reuse of attestation tokens is reduced or eliminated. An illustrative example of this batch process is depicted in FIG. 2.

In this example, an application 200 creates a number N public/private key pairs (201). For example, a web browser installed on the application 200 can generate the public/private key pairs. The public/private key pairs can be asymmetric key pairs. Each public/private key pair includes a private key and a public key that correspond to, and is mathematically linked to, the private key. Data that is digitally signed using a private key can only be verified using the corresponding public key. Similarly, data that is encrypted using the public key can only be decrypted using the corresponding private key.

The application 200 sends a request to an attestation token issuing server 230 for N attestation tokens (202). The number N can be an integer that is greater than or equal to two. In this example, the request is for N attestation tokens corresponding to the N public/private key pairs. The application 200 can determine the number N of attestation tokens to request based on a frequency at which the application 200 uses signed redemption results in requests. The application can generate a public/private key pair for each requested attestation token and include public key data in the request. In this example, the public key data can be the public keys themselves. The request thus involves passing N public keys 211 of the application 200 to the attestation token issuing server 230. In this example, the N public keys 211 include the actual public keys, e.g., the raw data of the N public keys 211. The request can also include device-level fraud detection signals. For example, the trusted program can collect the device-level fraud detection signals and include the signals in the request.

The request can be forwarded from application 200 to trusted program 220, similar to the process of steps A and B described above with respect to FIGS. 1A and 1B. The request can include information such as the user's credentials.

The attestation token issuing server 230 receives the request (231). Based upon the user credentials received from trusted program 220, the attestation token issuing server 230 determines a level of authentication of the client device (232). For example, the attestation token issuing server might have M possible levels of authentication. In this example, the attestation token issuing server 230 can select one of these M possible levels of authentication based upon the user credentials, as described above. The level of authentication may be encoded, for example, through a particular signature.

The attestation token issuing server 230 generates N attestation tokens (233). The attestation token issuing server 230 generates a respective attestation token for each received public key.

Each attestation token can include the verdict of authentication, a timestamp for the verdict of authentication, and one of the N public keys 211 of the application 200. The timestamp indicates the time at which the attestation token is generated. The attestation token issuing server can generate each attestation token based on one of the N public keys 211. For example, the attestation token issuing server 230 can assemble a set of data that includes the public key of the application 200, the authentication verdict, and the timestamp. In some approaches, where the verdict of authentication includes just two possible verdicts (authenticated or not authenticated), the verdict of authentication can be omitted from the attestation token. In other words, in these approaches, the attestation token issuing server can generate attestation tokens for users that are authenticated (with those tokens omitting the implied verdict of authentication) and simply decline to generate attestation tokens for users who are not authenticated.

The attestation token issuing server 230 digitally signs each of the N attestation tokens (234). For example, the attestation token issuing server 230 can generate a digital signature using a private key of its own and based on the other data of the attestation token (e.g., the authentication verdict, the public key of the application 200, and the timestamp).

The attestation token issuing server 230 transmits the N attestation tokens to the application (235). The application 200 receives and stores the batch of attestation tokens for later use (203). The application 200 can store the attestation tokens locally, e.g., in a cache or secure storage maintained by the application. Each cached attestation token can include, for example: (1) the verdict of trustworthiness as determined by the attestation token issuing server 230; (2) a timestamp for the creation of the attestation token; (3) a public key of the application; and (4) a digital signature of the token components, signed using a private key of the attestation token issuing server 230.

Having obtained a batch of attestation tokens, as illustrated in the example of FIG. 2, the client device can use the attestation tokens to assemble and send attestation tokens as part of various requests heading toward websites, content publisher domains, or other attestation token recipients, as discussed above. An illustrative example of such a request is depicted as a process flow diagram in FIG. 3.

To prepare a request, an application 300 can retrieve an attestation token from local storage of the application (301). In various approaches, the application 300 can, for example, (1) use a new attestation token for each request; or (2) use the same attestation token for a selected interval of time (e.g., H consecutive hours) and when that interval lapses use a different attestation token; or (3) use the same attestation token for all requests originated from the same application or website (e.g., where a different attestation token is used for each application or website); or (4) use a combination of two or more of these token reuse approaches (e.g., using the same attestation token for all requests originated from the same application or website within a selected interval of time). Thus, the application 300 can retrieve an attestation token based on the application or website for which the request is generated or the current time at which the request is generated.

The application 300 can generate a request to redeem an attestation token (302). The request 311 can include, for example, payload data (as discussed above), a request creation timestamp, the retrieved attestation token, the public key that corresponds to the attestation token, and a digital signature of the request components. In some implementations, a trusted program of the client device, or a trusted component of an operating system of the client device, can generate request 311, which can include or be in the form of an attestation token, by accessing the payload data and the attestation token. The application can also determine, as the request creation timestamp, a current time. The application can generate a digital signature of the payload data, the public key and the timestamp using a private key of the application (e.g., the private key corresponding to the public key included in the request). In some approaches, as a simple optimization to reduce attestation token size, the attestation token omits the device public key, because the public key is already present in the attestation token that is included as a component of the attestation token.

In some implementations, the ATI server 170 assists with redeeming the token, and is associated with the website to which access is requested in order to determine. In some implementations, when the tokens are issued using privacy-preserving techniques such as blinding or group signatures, the only information that the ATI server 170 learns by observing token redemptions is the approximate number of users or devices to which it previously issued a token that have visited this second content provider but, due to the privacy-preserving properties of the attestation tokens, cannot determine any particular users or devices.

The application 300 then sends the request 311 to attestation token issuing server 320 (303).

The attestation token issuing server 320 receives the request (321). The attestation token issuing server 320 validates the request (322). For example, the attestation token issuing server 320 can validate the request by verifying the digital signature of the request using the public key included in the request. The attestation token issuing server 320 can attempt to verify the digital signature using the public key and the content of the request signed over by the application 300, e.g., the payload data, the timestamp, the public key, and the attestation token. If any of this content changed after the digital signature was generated, the verification would fail. For example, if a malicious party inserted the attestation token into another request or inserted a different attestation token that had a higher verdict of authentication into the request, the signature verification would fail. This ensures that the content of the request was not changed during transmission of the request, e.g., by an intermediary.

The attestation token issuing server 320 validates the attestation token (323). For example, the attestation token issuing server 320 can validate the attestation token by verifying the signature of the attestation token using the public key of the attestation token issuing server. This similarly ensures that the content of the attestation token has not changed since the attestation token was issued by the attestation token issuing server. If the attestation token includes the device public key, the validation of the attestation token can also include a confirmation that the device public key included with the attestation token matches the device public key that is included within the attestation token.

The attestation token issuing server 320 validates the timeliness of the attestation token and authentication of the client device (324), e.g. to confirm that the attestation token was recently created (i.e. not created more than a selected interval of time such as H hours or D days before the time when the request was made, for H, D=1, 2, 3, . . . ) and to confirm that the authentication verdict in the attestation token is a verdict sufficient to honor the request.

If all of these validity checks pass, the attestation token issuing server 320 can respond to the request by redeeming the attestation token (325), e.g., to generate a signed redemption result, etc. as discussed above with respect to FIGS. 1A, 1B, and 2. If any of the validity checks fail, the attestation token issuing server 320 can ignore the request. For example, the attestation token issuing server 320 may not respond to the request, may not perform the operation requested, etc.

The application 300 receives the SRR (304). The application 300 can then send an access request 313 to a recipient computing system 330 (313). The access request 313 can include the SRR 312 and other parameters, including user data, context data, or a timestamp. As described above, the recipient can be a website to which access requested, a content provider or publisher, among other entities. For example, the application 300 can send the access request and the SRR to a content platform 150 and the content platform can send the request to one or more content publisher domains.

The recipient computing system 330 can receive the signed redemption result and, if all validity checks pass, respond to the request (331).

As discussed above, in some approaches, a blind signature scheme may be used in the process to generate the attestation tokens, so that the attestation token issuing server does not see the raw data of the public keys of the application. For example, the application can generate batches of private/public key pairs, and then blind the public keys (or suitable derivatives of these public keys that can be used as values for the commit phase of the blind signature scheme, such as cryptographic hashes of the public keys, or cryptographic hashes of the public keys concatenated with a device model number) using a blind signature scheme before sending the public keys to an attestation token issuing server to retrieve corresponding batches of attestation tokens. In this example, the attestation tokens are blindly signed with the blinded public keys. An illustrative example of this batch process is depicted in FIG. 4.

In this example, the attestation token issuing server 420 can define M different levels of authentication for applications, and publish M different blind signature verification keys 411 for the corresponding M levels of authentication (421). For example, the M levels can include two levels, authenticated and unauthenticated. In another example, the M levels can include three levels, suspicious, satisfactory, and fully authenticated. In other example, the M levels can include four levels, fraudulent, suspicious, subscriber, and special subscriber. Other quantities of levels can also be used. Therefore, M can be an integer that is greater than or equal to two. In some approaches, instead of assigning a blind signature verification key for the lowest level of authentication (e.g. an "unauthenticated" or "fraudulent" level of authentication), the lowest level of authentication can be omitted from the M levels of authentication, and the attestation token issuing server can simply decline to provide blind signatures for devices with the lowest level of authentication. Therefore, in these approaches, M can be an integer greater than or equal to one.

The attestation token issuing server 420 can generate a respective blind signature verification key 411 for each level of authentication using a blind signature scheme. The blind signature scheme can be a privately verifiable blind signature scheme, such as the Internet Engineering Task Force (IETF) Verifiable Oblivious Pseudorandom Functions (VO-PRF) blind signature scheme. In other approaches, the blind signature scheme can be a publicly verifiable blind signature scheme, such as a Rivest-Shamir-Adleman (RSA) blind signature scheme.

The attestation token issuing server 420 can publish the blind signature verification keys 411 such that the application, including the application 400, can obtain the blind signature verification keys 411. For example, the attestation token issuing server 420 can publish the blind signature verification keys 411 to a website or mobile app store.

The application 400 can receive these blind signature verification keys (401). For example, the application 400 can download the blind signature verification keys 411 and store the blind signature verification keys 411 locally, e.g., in secure storage or a cache. The application 400 can retain the blind signature verification keys 411 to verify blind signatures later received from the attestation token issuing server 420, as further discussed below. In some approaches, the attestation token issuing server 420 can periodically publish new blind signature verification keys 411 (e.g. every hour, day, week, or other appropriate time period) and this refreshing of the set of blind signature verification keys can be used to validate the timeliness of device integrity tokens, as further described below.

To obtain a batch of N attestation tokens, the application 400 creates N public/private key pairs (402). For example, a web browser can create a respective asymmetric public/private key pair for each attestation token.

The application 400 blinds the each public key or a derivative of each public key according to the blind signature scheme used to generate the blind signature verification keys (403). That is, the application 400 blinds public key data for each public key, where the public key data is either the public key or a derivative of the public key. Blinding a public key can include obscuring the raw value of the public key by applying a blinding factor to the raw value of the public key. In this way, the attestation token issuing server 420 cannot access the raw value of the public keys received from the application 400 and use those values to track the user or application 400, e.g., using data received from another entity that received the raw value of the public key with additional data.

To reduce the volume of data that needs to be blind-signed by the attestation token issuing server 420, instead of blinding each entire device public key, the application 400

(e.g., its trusted program) may generate a derivative of the public key and blind the derivative of the public key. The derivative can be a cryptographic hash of the public key. For example, the application 400 can generate a cryptographic hash of each public key using a cryptographic hash function and then blind the cryptographic hash of the public key using the blind signature scheme. In some implementations, the cryptographic hash algorithm can be SHA256.

In some implementations, the client device 420 can further reduce the data size of the blinded public key data by truncating the cryptographic hash, and then blind the truncated cryptographic hash. For example, this truncation can limit the cryptographic hash to 16-bytes from an original cryptographic hash having a larger data size. This truncation results in a shorter cryptographic hash that the application 400 blinds using the blind signature scheme.

Reducing the volume of data that is blindly signed in this way reduces the burden placed on the attestation token issuing server 420 (e.g., reduces CPU cycles, data storage requirements, memory consumption etc.) in blindly signing the data, which allows the attestation token issuing server 420 to generate the blind signatures faster, more efficiently, and handle more requests than if blinded versions of the full public keys were provided. This also reduces bandwidth consumption of the network over which the requests are sent and enables a large amount of blinded public key data to be sent in a single request.

The application 400 sends a request 412 to the attestation token issuing server 420 for N attestation tokens (404). The number N can be an integer that is greater than or equal to two. The request can include blinded public key data for each public key 411 generated by the application 400. For example, the request can include N blinded public keys, N blinded cryptographic hashes of public keys, or N blinded truncated cryptographic hashes of public keys. The request can also include device-level fraud detection signals, e.g., that are collected by the trusted program of the application 400. In some implementations, application 400 transmits request 412 through a trusted program (not shown) similar to the process as depicted with respect to FIGS. 1A, 1B, 2, and 3.

The attestation token issuing server 420 receives the request (422). The attestation token issuing server 420 determines a verdict of authentication of the application 400 based on the user credentials indicated in the request which may have been provided by a trusted program (423). In some implementations, the attestation token issuing server 400 can have M possible verdicts of authentication (corresponding to the M blind signature verification keys published in operation 421). The attestation token issuing server 420 can assign the application 400 to one of the M possible verdicts based on the device-level fraud detection signals.

Having determined a verdict of authentication of the application 400, the attestation token issuing server 420 generates a batch of attestation tokens (424). For example, the attestation token issuing server 400 can generate a attestation token for each public key generated in operation 402 above. Each attestation token can include, for example: (1) the public key of the application for which the attestation token is being generated; (2) the verdict of authentication as determined by the attestation token issuing server; and (3) the unblinded blind signature of the blinded public key or the cryptographic hash (e.g., truncated) of the public key. In some approaches, the attestation token can omit the verdict of authentication, as this can be implied from the unblinded blind signature. If the blind signature is not publicly verifiable, then when the attestation token issuing server is called upon to verify the blind signature (see, e.g., 541 in FIG. 5 as discussed below), the attestation token issuing server can also return the verdict. If the blind signature is publicly verifiable, then the public key that verifies the blind signature also implies the verdict of authentication of the device.

Having determined a verdict of authentication of the application 400 and generated the attestation tokens, the attestation token issuing server 400 signs each piece of blinded public key data (e.g., each N blinded public key or each blinded cryptographic hash) and attestation token using a blind signing private key (425). For example, the attestation token issuing server 420 can obtain the blind signing private key that corresponds to the verdict of authentication determined for the application 400, e.g., the blind signing private key corresponding to the public blind signature verification key for the determined verdict of authentication. Using the blind signing scheme in this way, the attestation token issuing server 420 can generate a digital signature of the blinded public key data without knowing the actual value of the public key data.

The attestation token issuing server 420 returns the N blind signatures 413 and the attestation tokens to the client device (426). In some implementations, the attestation tokens are signed using the blind signature scheme, and the N blind signatures 413 include the blind signed attestation tokens. The application 400 receives the blind signatures from the attestation token issuing server.

In some implementations, the application 400 can unblind the blind signatures using the blind signature scheme. For example, the application 400 can validate each blind signature using the blinded public key data for which the blind signature was generated and a blind signature verification key published by the attestation token issuing server 420 to verify the validity of the token and to ensure that no additional user data besides the verdict of authentication was encoded in the attestation token. To do this, the application 400 can attempt to validate the blind signature using multiple blind signature verification keys, e.g., for each verdict of authentication. If the verdict does not match the verdict assigned to the application 400, the blind signature would not be validated using the blind signature verification key for that verdict. The application can determine the assigned verdict of authentication of the application 400 based on the blind signature verification key that successfully validates the blind signature—e.g., the verdict of authentication corresponding to the blind verification key is the verdict assigned to the application 400. If validated, the application can then unblind the blind signature using the blind signature scheme.

The application 400 then stores the attestation tokens (405). For example, the trusted program of the application 400 can store the attestation tokens in secure storage for later use when sending requests that should include a attestation token. The secure storage can be a token cache of the application 400. As described above, in some implementations, the application 400 will attempt to validate the attestation tokens prior to storage. In some implementations, the application 400 will not attempt to validate the attestation tokens prior to storage, and will store the attestation tokens upon receipt.

Having stored a batch of attestation tokens, as illustrated in the example of FIG. 4, the application can then redeem the attestation tokens with the attestation token issuing server. Once redeemed, the attestation token issuing server provides a signed redemption result indicating only that an attestation token was successfully redeemed, and does not provide additional user information or other information that can be used to track user activity.

Upon receiving the signed redemption results, the application can store the signed redemption results to be transmitted as part of various requests made for content publisher domains, access to particular portions of a website, and/or particular content, among other requests, as discussed above. An illustrative example of such a request is depicted as a process flow diagram in FIG. 5.

To prepare a request, the application 500 can retrieve a signed redemption result, e.g., from a secure cache of the application (501). In various approaches, the application can, for example, (1) use a new signed redemption result for each request; or (2) use the same signed redemption result for a selected interval of time (e.g. H consecutive hours); or (3) use the same signed redemption result for all requests originated from the same application or website; or (4) use a combination of these redemption result reuse approaches (e.g., using the same signed redemption result for all requests originated from the same application or website within a selected interval of time). Thus, the application 500 can retrieve a signed redemption result based on the application or website for which the request is generated or the current time at which the request is generated.

The application 500 can assemble a request 511 that includes set of content that includes a request payload (as described above), a request creation timestamp that indicates a time at which the request is generated, the signed redemption result, and a device public key that corresponds to the signed redemption result (e.g., the public key for which public key data was blindly signed and that is included in the signed redemption result along with the unblinded blind signature). The request can also include a digital signature of the set of content, signed (502) using a private key of the application (e.g., the private key corresponding to the public key included in the request). For example, the trusted program of the application 500 can generate the digital signature based on the set of content using the private key. The request can include or be in the form of a signed redemption result. For example, the request can include the set of content (e.g., with the signed redemption result) and the digital signature.

The application 500 sends the request 511 to a computing system 520 of a recipient (503). The recipient can be, for example, a website to which access is requested or a content hosting platform to which access is requested or from which content is requested.

The recipient computing system 520 validates the request (522). The recipient computing system 520 can validate the request by verifying the digital signature of the request using the device public key included with the request. The recipient computing system 520 can also validate that the request by comparing the timestamp in the request to the time at which the request was received. If the signature is validated successfully and the timestamp is within a threshold duration of the current time, the application 500 can deem the request as being validated.

The recipient computing system 520 also validates the signed redemption result. This validation process can differ based on the blind signature scheme used by the attestation token issuing server 540 when generating the blind signatures. If the blind signature scheme is a publicly verifiable scheme (e.g., RSA), the recipient computing system 520 can validate the signed redemption result without invoking the attestation token issuing server (523*a*). In this example, the recipient computing system 520 can use the blind signature scheme to verify the unblinded blind signature of the public key data included in the signed redemption result. If a cryptographic hash of the public key is used, the recipient computing system 520 can generate the cryptographic hash of the public key included in the request (and truncate it if appropriate) using the same cryptographic hash function as the application 500 and use the blind signature scheme to verify the unblinded blind signature of the cryptographic hash.

If the blind signature scheme is a private verifiable scheme (e.g., IETF VOPRF), the recipient computing system 520 can invoke the attestation token issuing server 540 to verify the unblinded blind signature (523*b*). In this example, the recipient computing system 520 can send the unblinded blind signature and the public key or the cryptographic hash of the public key to the attestation token issuing server 540.

The attestation token issuing server 540 can attempt to verify the unblinded blind signature using the blind signature scheme (541). The response can indicate whether the verification was successful or not, and the trustworthiness of the client device corresponding to the blind signature verification key that verifies the unblinded blind signature.

The recipient computing system 520 validates the timeliness of the signed redemption result and the trustworthiness of the client device (524), e.g. to confirm that the signed redemption result was recently created and to confirm that the trustworthiness verdict in the signed redemption result is a verdict sufficient to honor the request. Because the attestation token issuing server 540 may periodically republish new blind signature verification keys, the timeliness validation can include confirming that that the blind signature of the signed redemption result is not signed with an invalid stale key, for example by determining that the signed redemption result was verified with a blind signature verification key that has expired. In one approach, the recipient computing system can determine that the blind signature verification key has expired because an effective date of the blind signature verification key was encoded as part of the URL for the published key. In another approach, the recipient computing system can determine that the blind signature verification key has expired because the verification key is published with metadata encoding the expiration date of the verification key.

If all of these validity checks pass, the recipient computing system 520 can respond to the request (525), e.g. to provide access to or deliver a resource, etc. as discussed above. If any of the validity checks fail, the recipient computing system 520 can ignore the request, e.g., elect to not send a response to the request, update settings, etc.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information (e.g., phone number, IMEI, device serial number) can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

Figure 6:
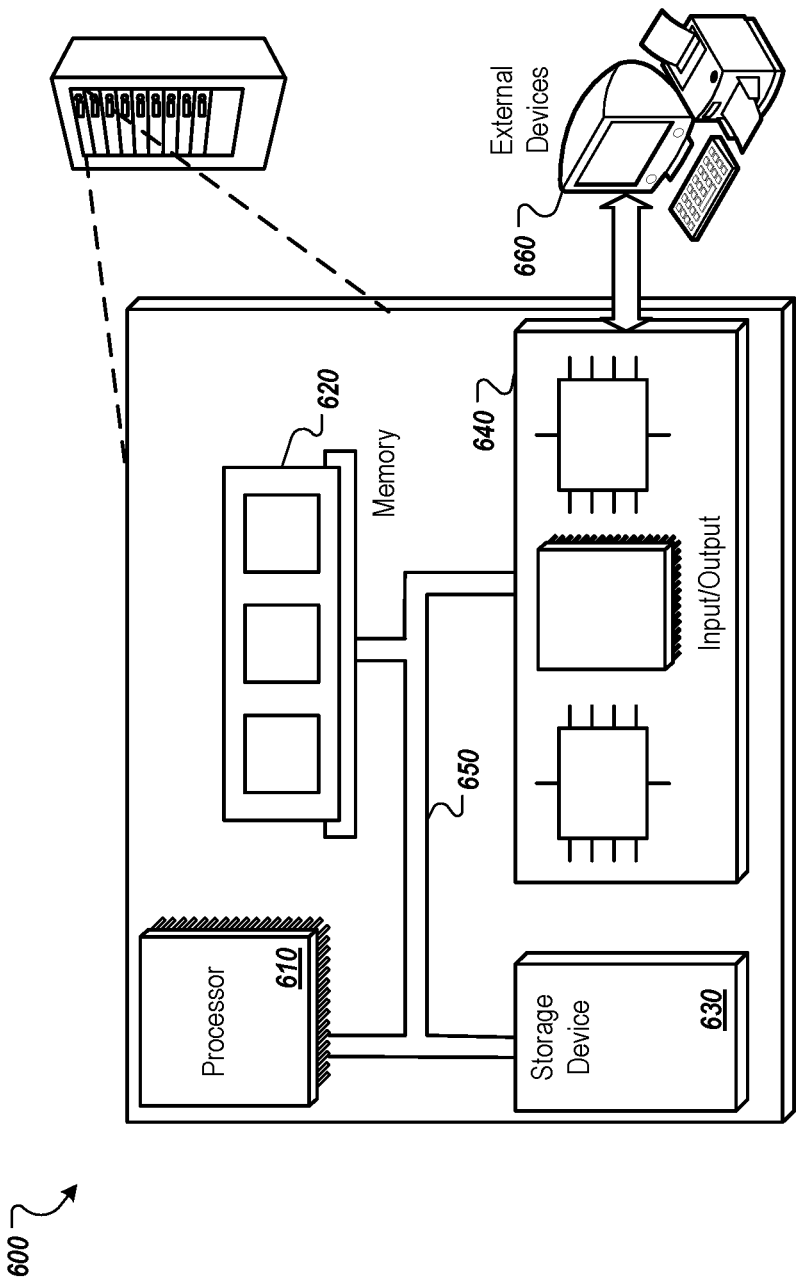
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for anonymous attestation, comprising:
    transmitting, by an application running on a client device and to a trusted program having access to credentials of a user of the client device that authenticate the user to an entity, a first request for an anonymous attestation token attesting to the user's authentication to a second content provider;
    transmitting, by the trusted program and to an attestation token issuing system, a second request for the anonymous attestation token, the second request including a set of credentials for the user of the client device; and
    receiving, by the application and from the attestation token issuing system, the anonymous attestation token comprising (i) an attestation token creation timestamp indicating a time of creation of the anonymous attestation token, and (ii) a first digital signature of the attestation token issuing system;
    receiving, by the application running on the client device and from a first server hosted on a first domain of a first content provider, an authentication request to authenticate the user to receive content from a second domain of the second content provider, wherein the second content provider is different from the first content provider;
    in response to receiving the authentication request, redeeming, by the application and with the attestation token issuing system that issued the anonymous attestation token attesting to the user's authentication to the second content provider, the anonymous attestation token by transmitting the anonymous attestation token with a third request;
    receiving, by the application and from the attestation token issuing system in response to the third request, a redemption result representing whether the anonymous attestation token was successfully redeemed and is signed by the attestation token issuing system using a second digital signature, wherein the redemption result is operable to verify, to the second content provider, that the user is authenticated to the second content provider without identifying the user to the second content provider; and transmitting, by the application and to the first content provider, the redemption result signed by the attestation token issuing system.

2. The method of claim 1, wherein the redemption result is operable to verify to a recipient that the user is authenticated to the second content provider while allowing the user to remain anonymous without providing the first content provider with the set of credentials for the user.

3. The method of claim 1, further comprising:
requesting, by the application and from the second content provider through an electronic resource of the first content provider, the content from the second content provider.

4. The method of claim 3, further comprising:
receiving, by the application, the content from the second content provider.

5. The method of claim 1, wherein the second digital signature is created according to a blind signature scheme.

6. The method of claim 1, wherein the second digital signature is created using a group signature scheme and an anonymous certificate issued to the client device; and
the method comprises storing the anonymous certificate in a secure private keystore on the client device.

7. The method of claim 1, wherein transmitting the redemption result signed by the attestation token issuing system further comprises providing additional data that (i) is signed by the application, and (ii) does not correlate the user with the set of credentials.

8. The method of claim 1, wherein the second request indicates a number of attestation tokens to be issued.

9. The method of claim 1, wherein the second request is signed with a third digital signature using a private key maintained by the application, and wherein the third digital signature can be verified using a public key (i) corresponding to the private key and (ii) published by the application.

10. The method of claim 9, wherein the first digital signature is created using a private key maintained by the attestation token issuing system, and wherein the third digital signature can be verified using a public key (i) corresponding to the private key and (ii) published by the attestation token issuing system.

11. The method of claim 1, wherein the redemption result comprises a single bit representing whether the anonymous attestation token was successfully redeemed.

12. A method for anonymous attestation, the method comprising:
receiving, by an application running on a client device and from a first server hosted on a first domain of a first content provider, an authentication request to authenticate a user to receive content from a second domain of a second content provider different from the first content provider;
in response to receiving the authentication request, redeeming, by the application and with an attestation token issuing system that issued an anonymous attestation token attesting to the user's authentication to the second content provider, the anonymous attestation token by transmitting the anonymous attestation token with a second request;

receiving, by the application and from the attestation token issuing system in response to the second request, a redemption result representing whether the anonymous attestation token was successfully redeemed and is signed by the attestation token issuing system using a digital signature, wherein the redemption result is operable to verify, to the second content provider, that the user is authenticated to the second content provider without identifying the user to the second content provider; and
transmitting, by the application and to the first content provider, the redemption result signed by the attestation token issuing system,
wherein the second content provider is a news provider,
wherein the first content provider is a news aggregator domain, and
wherein transmitting, by the application and to the first content provider, the redemption result signed by the attestation token issuing system is performed in response to a user action requesting access to a resource hosted by the news provider.

13. A method for anonymous attestation, the method comprising:
receiving, by an application running on a client device and from a first server hosted on a first domain of a first content provider, an authentication request to authenticate a user to receive content from a second domain of a second content provider different from the first content provider;
in response to receiving the authentication request, redeeming, by the application and with an attestation token issuing system that issued an anonymous attestation token attesting to the user's authentication to the second content provider, the anonymous attestation token by transmitting the anonymous attestation token with a second request;
receiving, by the application and from the attestation token issuing system in response to the second request, a redemption result representing whether the anonymous attestation token was successfully redeemed and is signed by the attestation token issuing system using a digital signature, wherein the redemption result is operable to verify, to the second content provider, that the user is authenticated to the second content provider without identifying the user to the second content provider; and
transmitting, by the application and to the first content provider, the redemption result signed by the attestation token issuing system,
wherein the second content provider is a media hosting platform, and
wherein the first content provider is a social media platform, and
wherein transmitting, by the application and to the first content provider, the redemption result signed by the attestation token issuing system is performed in response to a user action requesting access to a resource hosted by the media hosting platform.

14. A system, comprising:
one or more processors of a client device; and
one or more memories having stored thereon computer readable instructions configured to cause the one or more processors to perform operations comprising:
transmitting, by an application running on the client device and to a trusted program having access to credentials of a user of the client device that authenticate the user to an entity, a first request for the anonymous attestation token attesting to the user's authentication to a second content provider;

transmitting, by the trusted program and to an attestation token issuing system, a second request for the anonymous attestation token, the second request including a set of credentials for the user of the client device; and receiving, by the application and from the attestation token issuing system, an anonymous attestation token comprising (i) an attestation token creation timestamp indicating a time of creation of the anonymous attestation token, and (ii) a first digital signature of the attestation token issuing system;

receiving, by the application running on the client device and from a first server hosted on a first domain of a first content provider, an authentication request to authenticate the user to receive content from a second domain of the second content provider, wherein the second content provider is different from the first content provider;

in response to receiving the authentication request, redeeming, by the application and with the attestation token issuing system that issued the anonymous attestation token attesting to the user's authentication to the second content provider, the anonymous attestation token by transmitting the anonymous attestation token with a third request;

receiving, by the application and from the attestation token issuing system in response to the third request, a redemption result representing whether the anonymous attestation token was successfully redeemed and is signed by the attestation token issuing system using a second digital signature, wherein the redemption result is operable to verify, to the second content provider, that the user is authenticated to the second content provider without identifying the user to the second content provider; and transmitting, by the application and to the first content provider, the redemption result signed by the attestation token issuing system.

15. The system of claim 14, wherein the redemption result is operable to verify to a recipient that the user is authenticated to the second content provider while allowing the user to remain anonymous without providing the first content provider with the set of credentials for the user.

16. The system of claim 14, wherein:
the second content provider is a news provider,
the first content provider is a news aggregator domain, and
transmitting, by the application and to the first content provider, the redemption result signed by the attestation token issuing system is performed in response to a user action requesting access to a resource hosted by the news provider.

17. The system of claim 14, wherein:
the second content provider is a media hosting platform,
the first content provider is a social media platform, and
wherein transmitting, by the application and to the first content provider, the redemption result signed by the attestation token issuing system is performed in response to a user action requesting access to a resource hosted by the media hosting platform.

18. A non-transitory computer readable medium storing instructions that upon execution by one or more computers cause the one or more computers to perform operations comprising:

transmitting, by an application running on a client device and to a trusted program having access to credentials of a user of the client device that authenticate the user to an entity, a first request for the anonymous attestation token attesting to the user's authentication to a second content provider;

transmitting, by the trusted program and to an attestation token issuing system, a second request for the anonymous attestation token, the second request including a set of credentials for the user of the client device; and receiving, by the application and from the attestation token issuing system, an anonymous attestation token comprising (i) an attestation token creation timestamp indicating a time of creation of the anonymous attestation token, and (ii) a first digital signature of the attestation token issuing system;

receiving, by the application running on the client device and from a first server hosted on a first domain of a first content provider, an authentication request to authenticate the user to receive content from a second domain of the second content provider, wherein the second content provider is different from the first content provider;

in response to receiving the authentication request, redeeming, by the application and with the attestation token issuing system that issued the anonymous attestation token attesting to the user's authentication to the second content provider, the anonymous attestation token by transmitting the anonymous attestation token with a third request;

receiving, by the application and from the attestation token issuing system in response to the third request, a redemption result representing whether the anonymous attestation token was successfully redeemed and is signed by the attestation token issuing system using a second digital signature, wherein the redemption result is operable to verify, to the second content provider, that the user is authenticated to the second content provider without identifying the user to the second content provider; and transmitting, by the application and to the first content provider, the redemption result signed by the attestation token issuing system.

19. The non-transitory computer readable medium of claim 18, wherein:
the second content provider is a news provider,
the first content provider is a news aggregator domain, and
transmitting, by the application and to the first content provider, the redemption result signed by the attestation token issuing system is performed in response to a user action requesting access to a resource hosted by the news provider.

20. The non-transitory computer readable medium of claim 18, wherein:
the second content provider is a media hosting platform,
the first content provider is a social media platform, and
wherein transmitting, by the application and to the first content provider, the redemption result signed by the attestation token issuing system is performed in response to a user action requesting access to a resource hosted by the media hosting platform.

* * * * *